United States Patent
Kuragano et al.

(10) Patent No.: US 10,658,957 B2
(45) Date of Patent: May 19, 2020

(54) POWER TOOL

(71) Applicant: Koki Holdings Co., Ltd., Tokyo (JP)

(72) Inventors: Shinji Kuragano, Hitachinaka (JP); Takeru Kumakura, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/096,449

(22) PCT Filed: Mar. 31, 2017

(86) PCT No.: PCT/JP2017/013668
§ 371 (c)(1),
(2) Date: Oct. 25, 2018

(87) PCT Pub. No.: WO2017/187890
PCT Pub. Date: Nov. 2, 2017

(65) Prior Publication Data
US 2019/0131899 A1    May 2, 2019

(30) Foreign Application Priority Data

Apr. 28, 2016   (JP) .................................. 2016-091866

(51) Int. Cl.
*F04D 15/00*   (2006.01)
*H02P 6/28*   (2016.01)
(Continued)

(52) U.S. Cl.
CPC ................. *H02P 6/28* (2016.02); *B25F 5/00* (2013.01); *B25F 5/008* (2013.01); *H02K 5/20* (2013.01);
(Continued)

(58) Field of Classification Search
CPC .............. H02P 6/28; H02K 9/04; B23D 45/16
(Continued)

(56) References Cited

U.S. PATENT DOCUMENTS 5,540,210 A * 7/1996 Jones ..................... B23D 45/16
125/13.01
6,661,130 B2 * 12/2003 Yamazaki ................ H02K 9/04
310/12.14
(Continued)

FOREIGN PATENT DOCUMENTS

JP          57-177292       10/1982
JP          07-327816       12/1995
(Continued)

OTHER PUBLICATIONS

International Search Report for international application PCT/JP2017/013668 (dated May 23, 2017) 13 pages with translation.
(Continued)

*Primary Examiner* — Eduardo Colon Santana
*Assistant Examiner* — Gabriel Agared
(74) *Attorney, Agent, or Firm* — Kilpatrick Townsend & Stockton LLP

(57) ABSTRACT

A power tool includes a brushless motor, a supplying circuit, and a controller. The brushless motor is configured to drive and rotate when a voltage applied to the brushless motor is larger than or equal to an induced voltage. The supplying circuit is configured to apply a driving voltage to the brushless motor. The controller is configured to control the supplying circuit. The supplying circuit includes a rectifying circuit, a capacitor, and a switching circuit. The rectifying circuit is configured to rectify an alternating voltage and output a rectified voltage. The capacitor is configured to smooth the voltage inputted via the rectifying circuit. The switching circuit is configured to perform a switching operation based on a PWM signal to adjust a period during which the driving voltage is applied. The controller is configured to set a duty ratio within a prescribed range, and output the PWM signal of the set duty ratio to the switching circuit to control the switching operation. The controller is configured (Continued)

to perform a constant-number-of-rotation control for controlling the brushless motor to rotate at a target rotation number by changing the duty ratio. The capacitor has a capacitance allowing a smoothed voltage to be always larger than or equal to the induced voltage during the constant-number-of-rotation control.

14 Claims, 15 Drawing Sheets

(51) Int. Cl.
    *H02P 6/06*         (2006.01)
    *B25F 5/00*         (2006.01)
    *H02K 11/33*       (2016.01)
    *H02K 5/20*         (2006.01)
    *H02K 7/14*         (2006.01)
    *H02K 9/04*         (2006.01)
    *H02K 11/00*       (2016.01)
    *H02K 11/04*       (2016.01)
    *B23D 59/00*       (2006.01)
    *B23D 45/16*       (2006.01)
    *B23D 47/12*       (2006.01)

(52) U.S. Cl.
    CPC ................. *H02K 7/14* (2013.01); *H02K 9/04* (2013.01); *H02K 11/0094* (2013.01); *H02K 11/044* (2013.01); *H02K 11/33* (2016.01); *H02P 6/06* (2013.01); *B23D 45/16* (2013.01); *B23D 47/12* (2013.01); *B23D 59/001* (2013.01)

(58) Field of Classification Search
    USPC ............................................................ 318/3
    See application file for complete search history.

(56) References Cited

U.S. PATENT DOCUMENTS

| | | | |
|---|---|---|---|
| 2005/0166390 A1* | 8/2005 | Gooding | B23D 45/16 |
| | | | 29/527.2 |
| 2008/0022537 A1* | 1/2008 | Clarke | B23D 45/16 |
| | | | 30/390 |
| 2009/0082145 A1* | 3/2009 | Meixner | B23D 45/16 |
| | | | 474/109 |
| 2011/0171887 A1 | 7/2011 | Tanimoto et al. | |
| 2011/0214303 A1* | 9/2011 | Inayoshi | B23D 45/16 |
| | | | 30/374 |
| 2014/0001993 A1 | 1/2014 | Iwata et al. | |
| 2014/0084718 A1 | 3/2014 | Naito et al. | |
| 2015/0026985 A1 | 1/2015 | Yamaguchi et al. | |
| 2016/0250743 A1 | 9/2016 | Kikuchi et al. | |
| 2017/0012572 A1 | 1/2017 | Takano et al. | |

FOREIGN PATENT DOCUMENTS

| | | |
|---|---|---|
| JP | 10-146064 | 5/1998 |
| JP | 11-243668 | 9/1999 |
| JP | 2010173042 | 8/2010 |
| JP | 2012-196725 | 10/2012 |
| JP | 2012196723 | 10/2012 |
| JP | 2013-193133 | 9/2013 |
| JP | 2014079873 | 5/2014 |
| JP | 2015100887 | 6/2015 |
| WO | 2012098780 | 7/2012 |
| WO | 2015129358 | 9/2015 |
| WO | WO2015/179318 A1 | 11/2015 |

OTHER PUBLICATIONS

Japan Patent Office Notice of Reasons for Refusal for patent application JP2018-514218 (dated Sep. 5, 2019), 12 pages with translation.

* cited by examiner

POWER TOOL

TECHNICAL FIELD

The present invention relates to a power tool having a motor as a driving source.

BACKGROUND ART

Conventionally, a power tool drives a motor with a rectifying and smoothing circuit rectifying and smoothing an alternating-current voltage, and applying a rectified and smoothed voltage to the motor (see, Patent Literature 1). Such a rectifying and smoothing circuit has a capacitor used to smooth a rectified voltage.

CITATION LIST

[Patent Literature 1] Japanese Patent Application Publication No. 2012-196725

SUMMARY OF INVENTION

Technical Problem

However, since the capacitor of the above-described power tool has a small electrostatic capacity, the voltage cannot be sufficiently smoothed. As a result, the voltage outputted from the rectifying and smoothing circuit may become lower than an induced voltage produced by the motor, whereby there exists a non-energization period in which the voltage of a power supply is not applied to the motor (that is, current does not flow from the power supply to the motor). In the non-energization period, if the load of the motor increases, the motor cannot rotate at a constant rotational speed. For example, in a case where the power tool is an electric circular saw, a saw blade cannot rotate at a constant rotational speed. Thus, if a workpiece is cut with the saw blade rotating at an unstable rotational speed, a cut surface of the workpiece becomes uneven.

An object of the present invention is to provide a power tool without occurring a non-energization period of the driving voltage applied to the motor.

Solution to Problem

In order to attain the above and other objects, the disclosure provides a power tool. The power tool includes a brushless motor, a supplying circuit, and a controller. The brushless motor is configured to drive and rotate when a voltage applied to the brushless motor is larger than or equal to an induced voltage. The supplying circuit is configured to apply a driving voltage to the brushless motor. The controller is configured to control the supplying circuit. The supplying circuit includes a rectifying circuit, a capacitor, and a switching circuit. The rectifying circuit is configured to rectify an alternating voltage and output a rectified voltage. The capacitor is configured to smooth the voltage inputted via the rectifying circuit. The switching circuit is configured to perform a switching operation based on a PWM signal to adjust a period during which the driving voltage is applied. The controller is configured to set a duty ratio within a prescribed range, and output the PWM signal of the set duty ratio to the switching circuit to control the switching operation. The controller is configured to perform a constant-number-of-rotation control for controlling the brushless motor to rotate at a target rotation number by changing the duty ratio. The capacitor has a capacitance allowing a smoothed voltage to be always larger than or equal to the induced voltage during the constant-number-of-rotation control.

With this configuration, in the constant-number-of-rotation control, the number of rotation of the brushless motor is stable at the target rotational number. Accordingly, when the power tool cut a workpiece, a cut surface of the workpiece can be prevented from becoming uneven.

Preferably, the controller is configured to control the supplying circuit to stop application of the driving voltage to the brushless motor in a case where the current flowing in the brushless motor is larger than a maximum allowable current value. The capacitor has the capacitance allowing the driving voltage to be always larger than or equal to the induced voltage while the current flowing in the brushless motor is smaller than the maximum allowable current value. With this configuration, the current flowing in the brushless motor can be limited so as to prevent damage, and the rotation can be always stable when the current is lower than or equal to the maximum allowable current. That is, in all situations where the brushless motor rotates, the cut surface of the workpiece can be prevented from being uneven.

Preferably, the capacitance is larger than or equal to 500 microfarads.

Preferably, the capacitor includes a plurality of capacitors connected in parallel. With this configuration, a size of each capacitor can be reduced.

Preferably, the brushless motor includes a rotor configured to rotate about a rotational axis. The power tool further includes a fan and a housing. The fan is configured to rotate coaxially with the rotational axis. The housing accommodates the brushless motor, the supplying circuit, and the fan. The housing has an opening portion. The housing is formed with a wind path therein, the wind path extending from the fan to the opening portion. A longitudinal direction of the capacitor extends in a direction of a cooling air flowing in the wind path.

With this configuration, because the longitudinal direction of the capacitor extends in the direction of the cooling air flowing in the wind path, the capacitor can be efficiently cooled by the cooling air flowing in the longitudinal direction.

Preferably, the power tool further includes a circuit board and a board case. The switching circuit is mounted to the circuit board. The board case accommodates the circuit board. The capacitor is positioned at an end of the board case at a side where the opening portion is formed.

Preferably, the switching circuit is in contact with the circuit board. With this configuration, heat generated by the switching circuit is conducted to the circuit board, and radiated from the circuit board.

Preferably, a filler is filled between the capacitor and the circuit board.

Preferably, the brushless motor includes a rotor configured to rotate about a rotational axis. The power tool further includes a circuit board, a fan, and a housing. The switching circuit is mounted to the circuit board. The fan is configured to rotate coaxially with the rotational axis. The housing accommodates the circuit board, the brushless motor, the supplying circuit, and the fan. The housing has a first opening portion and a second opening portion which are formed at different positions. The housing is formed with a first wind path and a second wind path therein. The first wind path extends from the fan to the first opening portion. The second wind path extends from the fan to the second opening portion. The circuit board is disposed on the first wind path. The capacitor is disposed on the second wind path.

With this configuration, the cooling air passing the first wind path can cool the circuit board and the cooling air passing the second wind path can cool the capacitor.

Preferably, the brushless motor includes a rotor configured to rotate about a rotational axis. The power tool further includes a centrifugal fan and a circuit board. The centrifugal fan is configured to rotate coaxially with the rotational axis. The circuit board has one surface on which the capacitor is disposed and another surface on which the switching circuit is disposed. The circuit board extends in a radial direction of the rotational axis.

With this configuration, the cooling air passes one surface of the circuit board and another surface of the circuit board, thereby cooling efficiently the capacitor and the switching circuit.

Preferably, the brushless motor includes a rotor configured to rotate about a rotational axis. The power tool further includes a centrifugal fan and a circuit board. The centrifugal fan is configured to rotate coaxially with the rotational axis. The capacitor is mounted to the circuit board. The capacitor is disposed closer to the centrifugal fan than the circuit board to the centrifugal fan.

With this configuration, the capacitor is exposed directly to the cooling air from the centrifugal fan, thereby improving cooling efficiency of the capacitor.

Advantageous Effects of Invention

According to a power tool of the present invention, in the constant-number-of-rotation control, the number of rotation of the brushless motor is stable at the target rotational number. Accordingly, when the power tool cut a workpiece, a cut surface of the workpiece can be prevented from becoming uneven.

DESCRIPTION OF EMBODIMENT

First Embodiment

Figure 1:
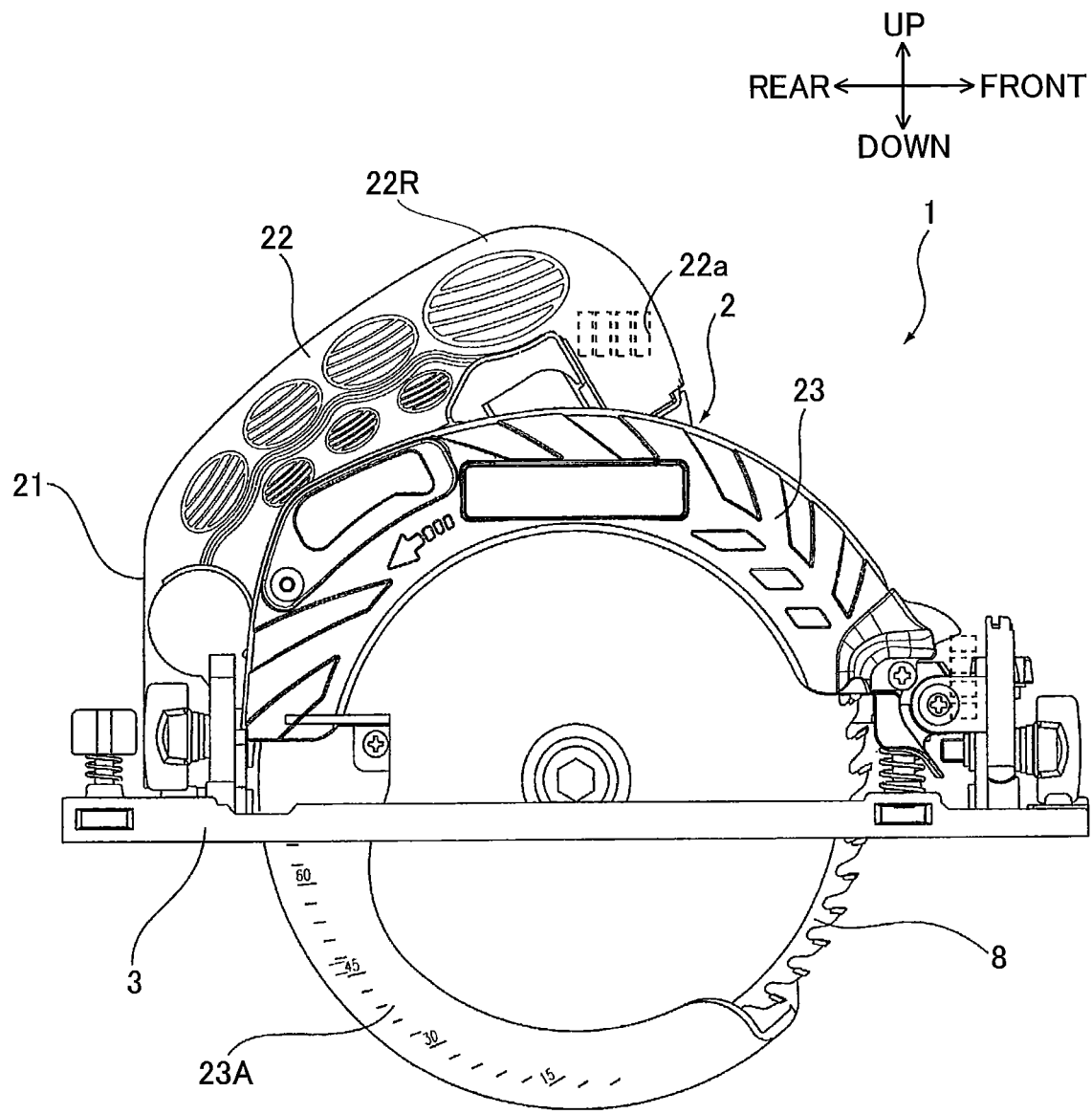
FIG. 1 is a right side view illustrating an exterior of an electric circular saw according to a first embodiment of the present invention.

A power tool according to a first embodiment of the present invention will be explained while referring to FIGS. 1-11. An electric circular saw 1 which is a power tool illustrated in FIG. 1 includes a housing 2 rotatably supporting a saw blade 8, and a base 3. The electric circular saw 1 is a tool to cut a workpiece by rotating the saw blade 8 and sliding the base 3 on the workpiece. Hereinafter, the "front", "rear", "upward" and "downward" indicated by arrows in FIG. 1 are defined as a front direction, a rear direction, an upward direction, and a downward direction. In addition, the right when viewed from the back side is defined as a right direction, and the left when viewed from the back side is defined as a left direction (the right direction is a near side with respect to the sheet of FIG. 1, and the left direction is a far side with respect to the sheet of the same).

As shown in FIG. 1, the housing 2 can lean toward the right or the left direction, with respect to the base 3. The base 3 may be a plate-shaped member made of metal, such as aluminum. The base 3 is formed with an opening (not illustrated) passing therethrough in the upward-downward direction and extending in the front-back direction. The saw blade 8 can be inserted through the opening. The longitudinal direction (front-back direction) of the base 3 corresponds to a cutting direction.

Figure 2:
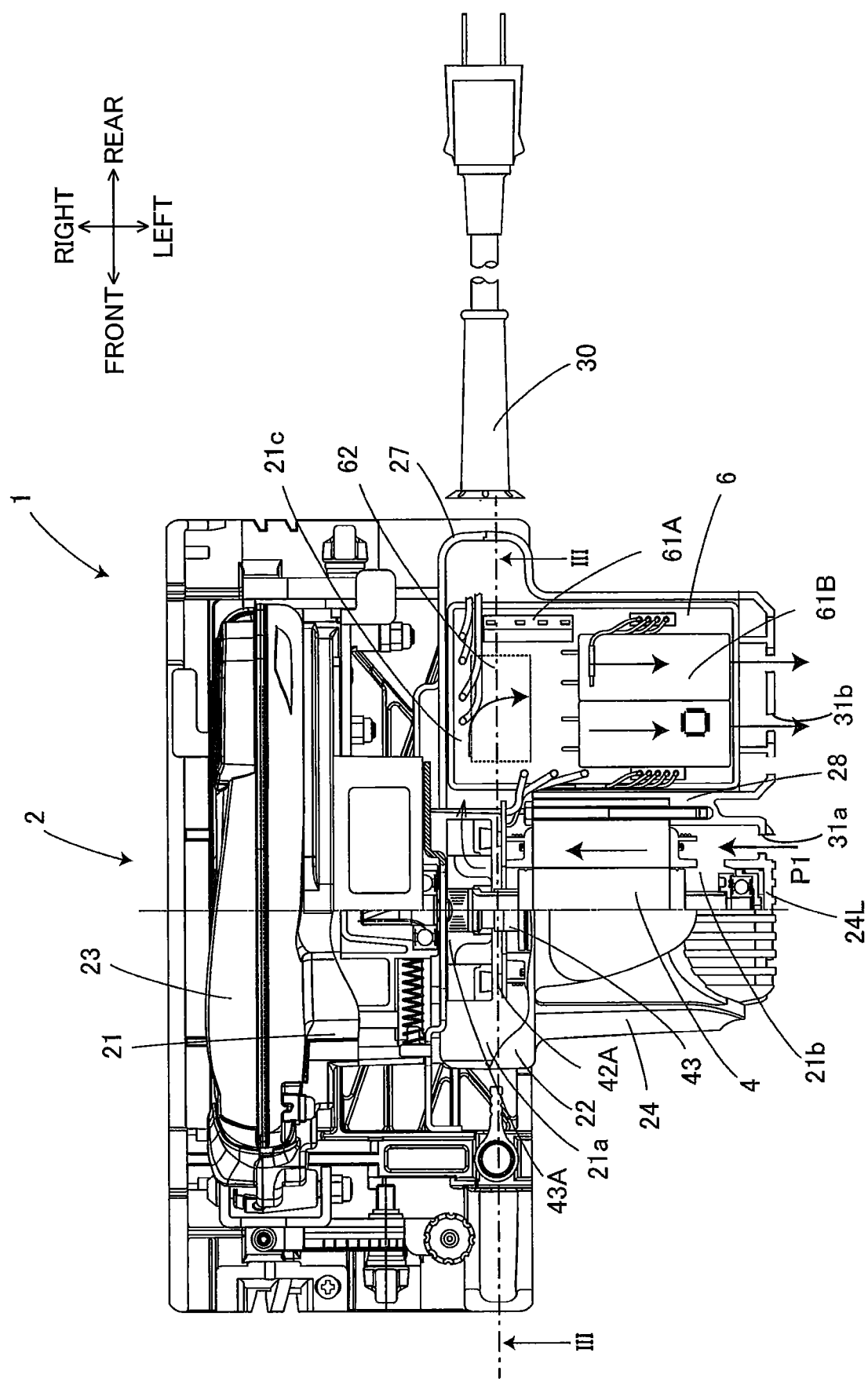
FIG. 2 is a plan view with a partial cross section illustrating the exterior of the electric circular saw according to the first embodiment of the present invention.

The housing 2 includes a main-body housing 21, a handle portion 22, a saw cover 23, and a motor housing 24 (FIG. 2). As illustrated in FIG. 2, the saw cover 23 is disposed on a right-side portion of the main-body housing 21, and the motor housing 24 protrudes leftward from the main-body housing 21. The main-body housing 21 may be made of resin, and rotatably supports the saw blade 8. The motor housing 24 accommodates a motor 4 and a control board 6.

As illustrated in FIG. 1, the saw blade 8 is formed in a disk shape, and rotatably disposed in a right-side portion of the main-body housing 21. The saw blade 8 is rotated by the rotation of the motor 4.

Figure 3:
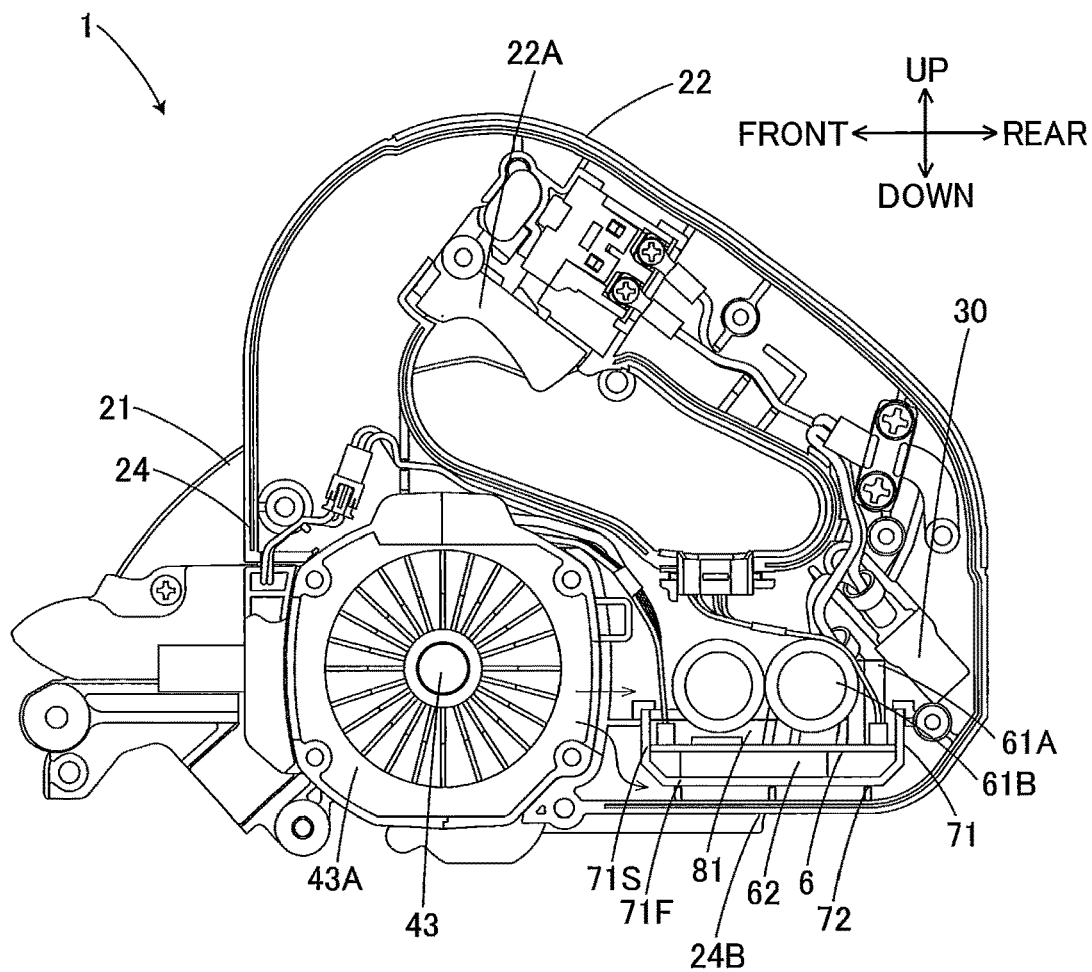
FIG. 3 is a side view illustrating an interior of the electric circular saw according to the first embodiment of the present invention.

As illustrated in FIGS. 1 and 3, the handle portion 22 is held by a user when the user uses the electric circular saw 1. The handle portion 22 extends in the front-back direction on the motor housing 24. The handle portion 22 is provided with a trigger 22A used to control the driving of the motor 4. The trigger 22A is electrically connected to the control board 6 in the housing 2, and outputs a start signal used to start the motor 4 to the control board 6, when a user pushes the trigger 22A upward.

As illustrated in FIG. 1, the saw cover 23 is made of metal for example. The saw cover 23 has, from side view, an arc shape which is formed along an outer edge of the saw blade 8 and disposed on the right side of the main-body housing 21 so as to cover almost upper half of the saw blade 8. The saw cover 23 is provided with a protection cover 23A. The protection cover 23A may be made of resin, and can rotate along the outer edge of the saw blade 8. When cutting work is not performed, the protection cover 23A covers lower half of the peripheral edge of the saw blade 8 (that is, the protection cover 23A covers a portion of the peripheral edge which protrudes downward from the base 3) except for one front portion of the saw blade 8.

FIG. 2 is a plan view of the electric circular saw 1 for illustrating an internal structure of the housing 2. In FIG. 2, a part of the main-body housing 21 and a part of the motor housing 24 are omitted. The motor housing 24 is made of resin. A motor housing room 21b, a control-board housing room 21c, and a housing room 21a are defined in the motor housing 24. The motor housing room 21b accommodates the motor 4. The control-board housing room 21c accommodates the control board 6. The housing room 21a accommodates a fan 43A. More specifically, the motor housing 24 includes a bottom wall 24B (FIG. 3), and a left wall 24L in which an inlet 31a and an outlet 31b are formed. In the interior of the motor housing 24, an inner wall 27 and a partition wall 28 are formed. The inner wall 27 extends in the front-back direction on the left side with respect to the saw blade 8, and extends leftward from the rear end portion of the inner wall 27 so as to be connected to the left wall 24L. The partition wall 28 is disposed between the inlet 31a and the outlet 31b in the front-back direction. The partition wall 28 is connected to the left wall 24L, and extends rightward from the left wall 24L to a prescribed position which is on the left side with respect to the inner wall 27. That is, the partition wall 28 is disposed so that a gap is formed between the inner wall 27 and the partition wall 28 in the right-left direction. The housing rooms (the housing room 21a, the motor housing room 21b, and the control-board housing room 21c) are defined in the main-body housing 21, by the motor housing 24, the inner wall 27, and the partition wall 28. The control board 6 is one example of the supply circuit.

The motor 4 and the fan 43A are disposed in front side of the partition wall 28, and a board case 71 is disposed in rear side of the partition wall 28. The board case 71 accommodates the control board 6, and is disposed in the control-board housing room 21c. As indicated by an arrow of FIG. 2, a wind path P1 is formed from the inlet 31a to the outlet 31b, by the motor housing 24, the inner wall 27, and the partition wall 28. The inlet 31a is formed so that the motor housing room 21b communicates with the outside, and the outlet 31b is formed so that the control-board housing room 21c communicates with the outside. Here, the fan 43A is a centrifugal fan. When the fan 43A rotates, cooling air flows from the inlet 31a toward the outlet 31b. Specifically, the wind path P1 is substantially U-shaped; and extends in the right direction from the inlet 31a to the fan 43a, extends in the back direction from the fan 43A to the board case 71 (control board 6), and extends in the left direction from the board case 71 (control board 6) to the outlet 31b. In other words, in the wind path P1, the motor 4, the fan 43A, and the board case 71 (control board 6) are disposed in this order in a direction in which the cooling air flows. The inlet 31a and the outlet 31b are disposed at the same height in the upward-downward direction as that of the fan 43A. That is, each of the inlet 31a and the outlet 31b has a region overlapping with the fan 43A in the upward-downward direction. The wind path P1 is one example of the wind path or the first wind path.

Figure 4A:
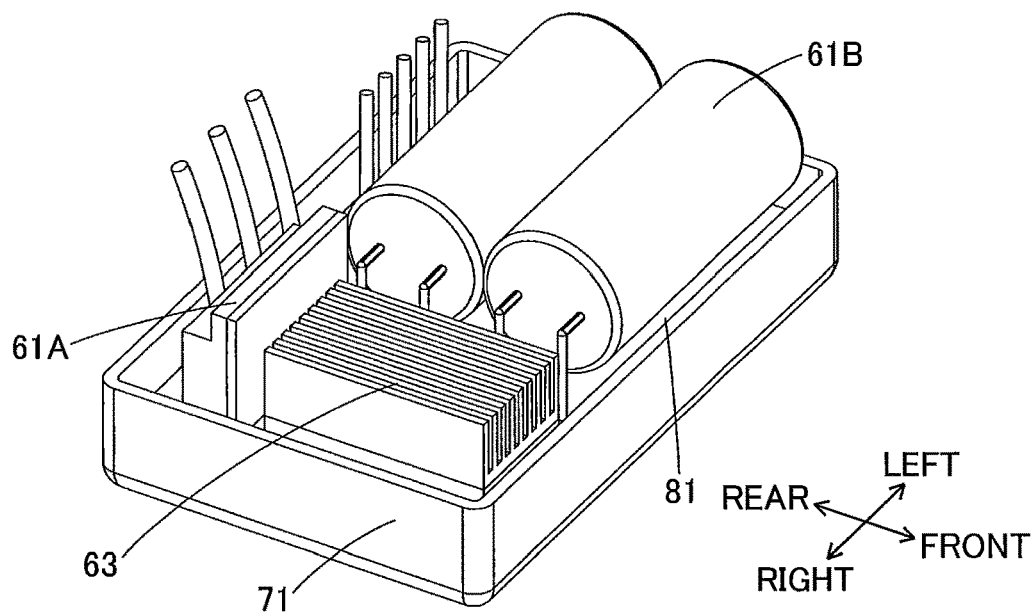
FIG. 4(A) is a perspective view from the upper left illustrating a board case of the electric circular saw according to the first embodiment of the present invention.
Figure 4B:
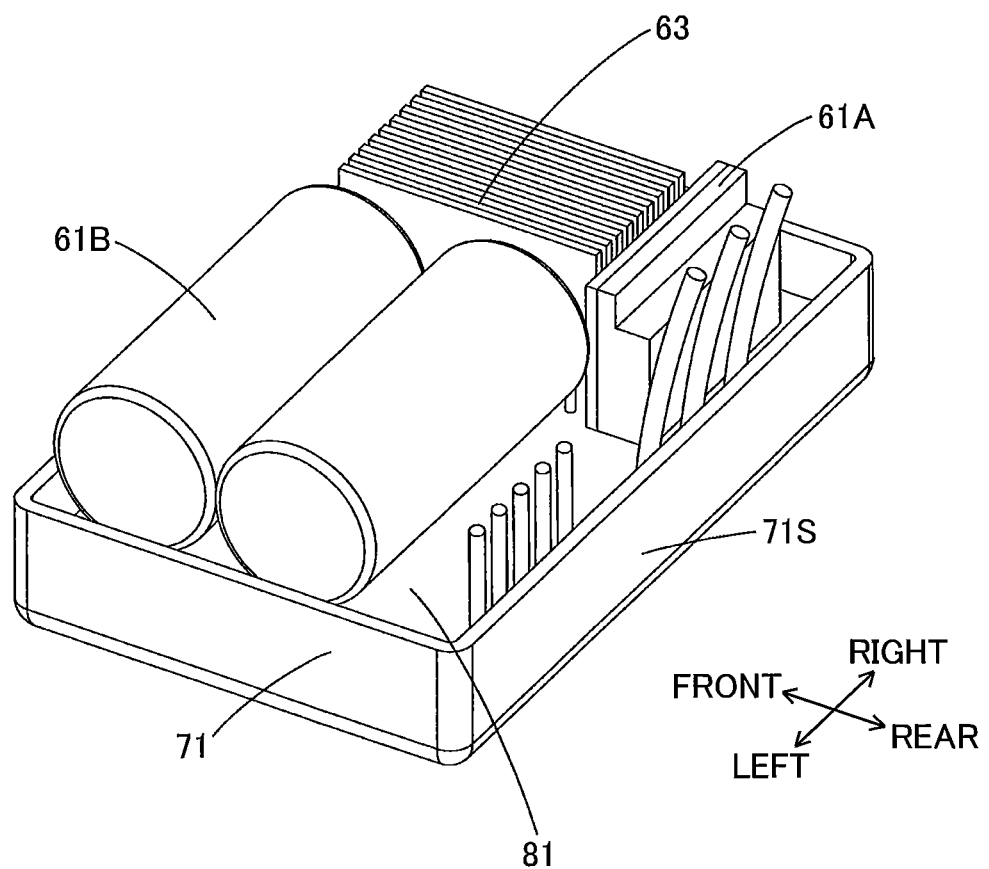
FIG. 4(B) is a perspective view from the upper right illustrating the board case of the electric circular saw according to the first embodiment of the present invention.

The board case 71 is made of material having high thermal conductivity, such as metal. As illustrated in FIGS. 4(A) and 4(B), the board case 71 is formed in a box shape whose upper portion is opened, and includes a fixed wall 71F (FIG. 3) and a side wall 71S formed around the outer periphery of the fixed wall 71F. As illustrated in FIG. 3, the board case 71 accommodates the control board 6. The board case 71 is fixed to the bottom wall 24B of the motor housing 24 (control-board housing room 21c) via ribs 72, in the motor housing 24. That is, the fixed wall 71F is disposed so that a gap is formed between the fixed wall 71F and the bottom wall 24B of the motor housing 24. In this configuration, the cooling air can flow through the space between the board case 71 and the motor housing 24, and thus the cooling air flows above and below the board case 71, thereby effectively cooling the board case 71.

As illustrated in FIG. 2, the electric circular saw 1 includes a power supply cord 30, which can be connected to a commercial alternating-current power supply having a voltage of 100 V and a frequency of 50 Hz, for example. The power supply cord 30 extends backward from a left rear portion of the motor housing 24. The power supply cord 30 can be connected to a commercial alternating-current power supply 500. The power supply cord 30 is electrically connected to the control board 6, and the electric power of the commercial alternating-current power supply 500 is supplied to the motor 4 via the power supply cord 30 and the control board 6.

Figure 5:
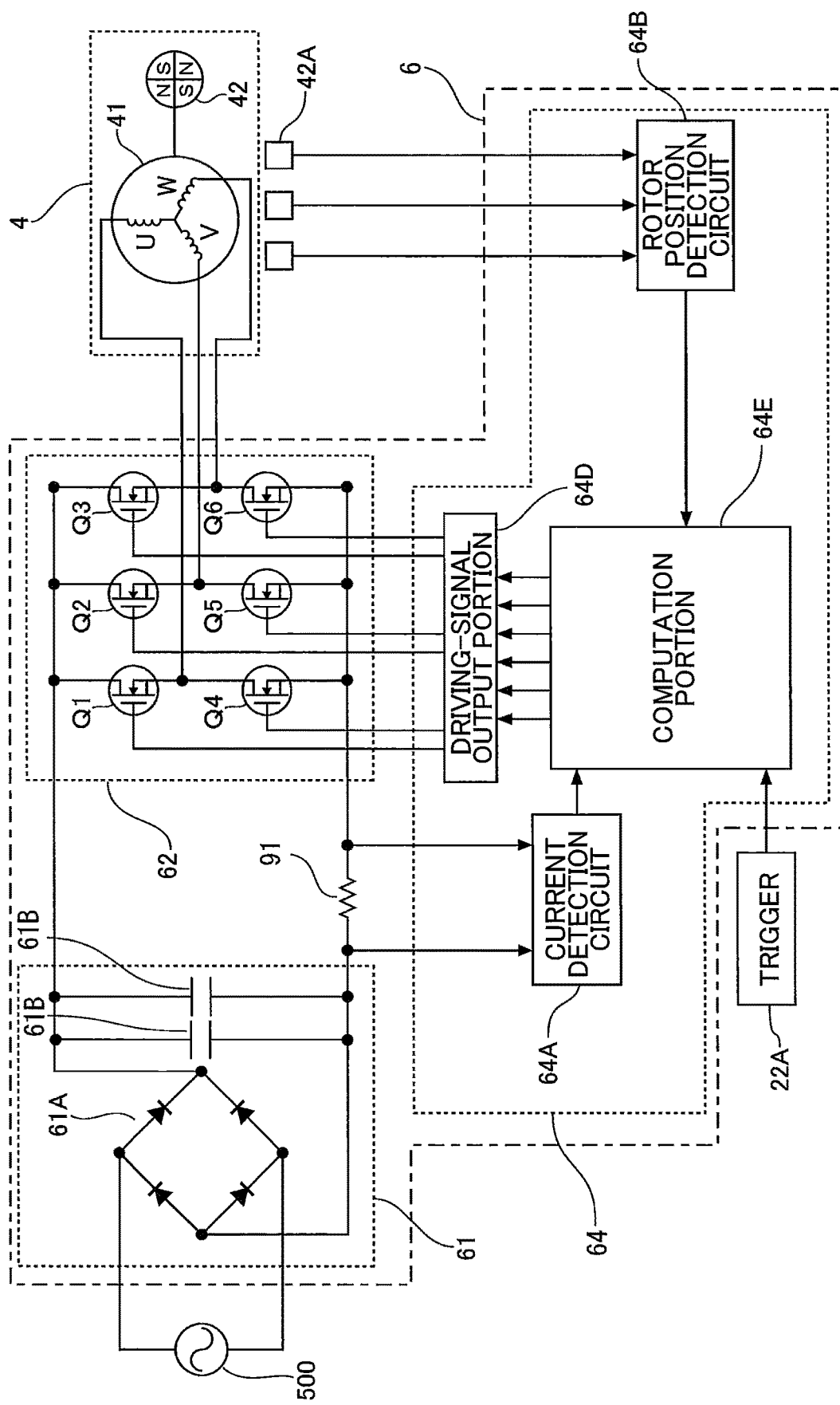
FIG. 5 is a block diagram illustrating an electrical configuration of the electric circular saw according to the first embodiment of the present invention.

As illustrated in FIG. 5, the motor 4 is a three-phase brushless DC motor including a stator 41 and a rotor 42. The stator 41 includes three-phase coils U, V, and W, which are star-connected. Each of the coils U, V, and W is connected to the control board 6. The rotor 42 includes two permanent magnets, and each magnet has the N-pole and the S-pole. Hall devices 42A are disposed at positions facing the permanent magnets. The Hall devices 42A output positional signals of the rotor 42 to the control board 6.

A rotation shaft 43 illustrated in FIG. 2 is connected to a rotational center portion of the rotor 42, and rotates with the rotor 42. The rotation shaft 43 extends in the right-left direction, and is rotatably supported by the motor housing 24. The rotation shaft 43 is also connected to a rotational center portion of the fan 43A. Thus, the fan 43A can rotate coaxially with the motor 4. When the rotation shaft 43 is rotated, the fan 43A rotates to generate the cooling air. The cooling air flows through a space in the vicinity of the motor 4 and the control board 6, and cools the motor 4 and the control board 6. As described above, the fan 43A is the centrifugal fan. The rotation shaft 43 is also connected to the saw blade 8 via a speed reduction mechanism (not illustrated). Thus, the saw blade 8 is rotated by the rotation of the rotation shaft 43.

As described in FIG. 5, the control board 6 includes a rectifying and smoothing portion 61, a switching portion 62, a current detection resistor 91, and a controller 64. The rectifying and smoothing portion 61 includes a diode bridge 61A and two smoothing capacitors 61B (hereinafter, simply referred to as capacitors 61B) connected in parallel with each other. The rectifying and smoothing portion 61 is connected to the commercial alternating-current power supply 500 and the switching portion 62. The diode bridge 61A is one example of the rectifying circuit, and the switching portion 62 is one example of the switching circuit. Here, the capacitors 61B are electrolytic capacitors.

As illustrated in FIG. 3, the diode bridge 61A and the two capacitors 61B are mounted on one surface (upper side) of the control board 6, and the switching portion 62 is mounted on another surface (lower side) of the control board 6. As illustrated in FIGS. 4(A) and 4(B), the space between the capacitors 61B and the control board 6 is filled with a filler 81. The capacitors 61B are positioned relative to the control board 6 and the board case 71 by the filler 81. The diode bridge 61A has a heatsink 63 having a rectangular shape disposed on the front side of the diode bridge 61A. Thus, the heat generated by the diode bridge 61A is radiated by the heatsink 63. The switching portion 62 is disposed below the heatsink 63, and is in contact with the heatsink 63 and the fixed wall 71F. With this arrangement, the heat generated by the switching portion 62 is conducted to the heatsink 63 and the board case 71. As described above, since the cooling air flows through the space between the board case 71 and the motor housing 24, the board case 71 can be efficiently cooled by the cooling air. Here, the controller 64 may be disposed between the heatsink 63 and the control board 6, and be in contact with the heatsink 63. In such a configuration, the heat generated by the controller 64 is also radiated by the heatsink 63.

Each of the capacitors 61B has a substantially cylindrical shape whose generating line is the longitudinal direction of the capacitors 61B. As illustrated in FIG. 2, the capacitors 61B are disposed so that the longitudinal direction of the capacitors 61B extends in the right-left direction. In other words, the longitudinal direction of the capacitors 61B extends in a direction in which the cooling air flows. The capacitors 61B are disposed adjacent to each other at one edge portion of the control board 6 in the direction in which the cooling air flows. Thus, the capacitors 61B are efficiently cooled by the cooling air flowing in the longitudinal direction.

As illustrated in FIG. 5, the diode bridge 61A performs full-wave rectification of an alternating-current voltage outputted from the commercial alternating-current power supply 500. The capacitors 61B smooth the full-wave rectified voltage, and outputs a smoothed voltage to the switching portion 62.

The two capacitors 61B are connected in parallel with each other between an input line and an output line of the commercial alternating-current power supply 500. The number of the capacitors 61B is not limited to two, and may be three or more as long as a total electrostatic capacity of the capacitors 61B, which are connected in parallel with each other, is equal to or larger than a prescribed electrostatic capacity (for example, 1050 microfarads) (described later). Alternatively, a single capacitor 61B may be used if the electrostatic capacity of the single capacitor 61B is equal to or larger than the prescribed electrostatic capacity. Here, in the case where the plurality of capacitors 61B are used, each capacitor can be downsized, compared to the single capacitor 61B. Thus, each of the capacitors 61B can be disposed in each of a plurality of small spaces. Hereinafter, the electrostatic capacity is simply referred to as capacitance.

The switching portion 62 is a switching circuit having six FETs Q1 to Q6. The six FETs Q1 to Q6 are connected with each other in a three-phase bridge configuration. The gates of the six FETs Q1 to Q6 are connected to the controller 64, and drains or sources of the six FETs Q1 to Q6 are connected to the coils U, V, and W, which are star-connected. The six FETs Q1 to Q6 perform switching operation in which the FETs Q1 to Q6 repeatedly turn on and off in accordance with driving signals outputted from the controller 64 so as to supply the coils U, V, and W with, as three-phase voltages, the direct-current voltage which is generated through the full-wave rectification by the rectifying and smoothing portion 61. The FETs Q1 to Q6 correspond to the switching circuit. Instead of the FETs Q1 to Q6, the switching portion 62 may use six insulated-gate bipolar transistors. The switching portion 62 applies the driving voltage to the motor 4.

The current detection resistor 91 is a resistor to detect current which flows in the motor 4, and is connected between the rectifying and smoothing portion 61 and the switching portion 62.

The controller 64 includes a current detection circuit 64A, a rotor position detection circuit 64B, a driving-signal output portion 64D, and a computation portion 64E. The current detection circuit 64A detects a value of voltage drop by the current detection resistor 91, and outputs the value to the computation portion 64E. The rotor position detection circuit 64B receives the positional signals of the rotor 42 from the Hall devices 42A of the motor 4, and outputs a resulting positional signal of the rotor 42 to the computation portion 64E. The driving-signal output portion 64D is connected to the gates of the six FETs Q1 to Q6; and applies voltages to the gates of the six FETs Q1 to Q6, depending on driving signals outputted from the computation portion 64E. Among the six FETs Q1 to Q6, an FET whose gate is applied with the voltage is turned on to allow current to flow in the motor 4, and an FET whose gate is not applied with the voltage is turned off to prevent a current from flowing therethrough to the motor 4.

The computation portion 64E includes a central processing unit (CPU), a ROM, and a RAM, which are not illustrated. The CPU outputs the driving signals depending on a processing program and data. The ROM stores the processing program, control data, and various threshold values. The RAM temporarily stores data. The computation portion 64E generates control signals to alternately switch the FETs Q1 to Q6, in accordance with the positional signal of the rotor 42 outputted from the rotor position detection circuit 64B, and outputs the control signals to the driving-signal output portion 64D. With this operation, the coils U, V, and W are alternately energized to rotate the rotor 42 in a prescribed rotational direction. In this case, the driving signals outputted to the FETs Q4 to Q6, which are connected to the negative side of the power supply, are pulse width modulation signals (PWM signals).

The controller 64 sets a duty ratio, and outputs PWM signals having the duty ratio to the FETs Q4 to Q6 to turn on and off the FETs Q4 to Q6 at high speed. With the FETs Q4 to Q6 turned on and off in this manner, the controller 64 adjusts the amount of power supply to the motor 4 (more specifically, the period of time in which the driving voltage is applied to the motor 4), and thereby controls the number of rotations (rotational speed) of the motor 4. The PWM signal is a signal that can change an ON period, in which an FET is turned on, in a cycle of a switching (a prescribed period of time), that is, a signal that can change a signal output time (pulse width). Thus, the duty ratio is a ratio of the signal output time to the cycle of switching (the prescribed period). The controller 64 changes the amount of power supply to the motor 4, by changing the duty ratio to change the ON period in the cycle of switching for each of the FETs Q4 to Q6. In other words, the controller 64 adjusts a period of time in which the driving voltage is applied to the motor 4, by changing the duty ratio. The computation portion 64E controls the start/stop of the motor 4, depending on a start signal sent from the trigger 22A.

The electric power supplied to the motor 4 is determined in accordance with a comparison result between a target number of rotations and the number of rotations of the motor 4 which is calculated by using the positional signal of the rotor 42 outputted from the rotor position detection circuit 64B. The electric power is adjusted so that the number of rotations of the motor 4 becomes equal to the target number of rotations. In the present embodiment, the electric power is adjusted so that the number of rotations of the saw blade 8, whose speed is reduced by the speed reduction mechanism, is 4100 rpm. Thus, the controller 64 can perform constant-number-of-rotations control which allows the number of rotations of the motor 4 to become the target number of rotations.

In the present embodiment, the computation portion 64E changes the duty ratio in a prescribed range. In the present embodiment, the prescribed range is 10 to 100%. The prescribed range is not limited to this, and may be 5 to 90%. The computation portion 64E performs the constant-number-of-rotations control for rotating the motor 4 at the target number of rotations, by controlling the driving-signal output portion 64D to output PWM signals having a set duty ratio to the corresponding one of FETs Q4 to Q6. When the saw blade 8 has a load having a value equal to or larger than a prescribed value, the number of rotations of the motor 4 cannot be kept at the target number of rotations, and decreases even if the duty ratio has been set at an upper limit (100% in the present embodiment). In this case, the computation portion 64E continues to set the duty ratio at the upper limit. When the load of the saw blade 8 increases, the current which flows in the motor 4 increases because the induced voltage of the motor 4 decreases. In the present embodiment, the constant-number-of-rotations control is performed until the effective current which flows in the motor 4 has a value of 6 A. When the current which flows in the motor 4 exceeds 6 A as the load of the saw blade 8 increases, the number of rotations of the motor 4 decreases while the maximum value of the duty ratio in the prescribed range is kept. The computation portion 64E monitors the amount of current which flows in the motor 4, by using detection result by the current detection circuit 64A. When the current flowing in the motor 4 exceeds an overcurrent threshold (18 A in the present embodiment), the computation portion 64E turns off the FETs Q4 to Q6 to stop the application of the driving voltage to the motor 4 by the switching portion 62.

Figure 6A:
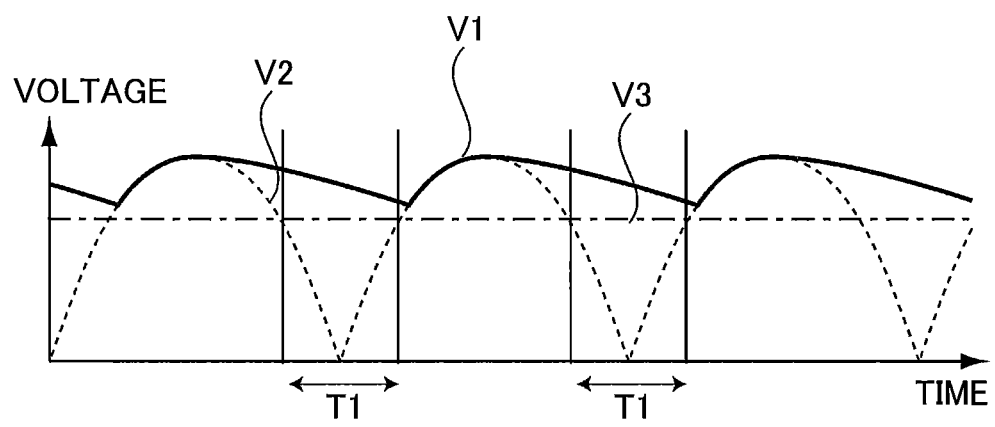
FIG. 6(A) is a graph illustrating a driving voltage applied to a motor of the electric circular saw according to the first embodiment of the present invention.

FIG. 6(A) is a graph illustrating a driving voltage V1 applied to the motor 4 of the present embodiment, in a case where the load of the saw blade 8 (or the load of the motor 4; the same holds true in the following description) is constant, and where the constant-number-of-rotations control is performed. In FIG. 6(A), the horizontal axis represents the time, and the vertical axis represents the voltage. In addition, a dotted line indicates an imaginary driving voltage V2 (hereinafter referred to as an imaginary voltage V2) obtained when the capacitors 61B are not disposed in the rectifying and smoothing portion 61, and an alternate long and short dashed line indicates an induced voltage V3 of the motor 4 obtained when the motor 4 rotates at the target number of rotations.

The imaginary voltage V2 is substantially the same as a voltage into which the alternating-current voltage is full-wave rectified, and becomes zero at a prescribed cycle. If the imaginary voltage V2 is applied to the motor 4 when the motor 4 rotates at the target number of rotations, the imaginary voltage V2 would become equal to or lower than the induced voltage V3 in a period of time T1, and no current would flow to the motor 4. As a result, the number of rotations of the motor 4 could not be kept at the target number of rotations, and the number of rotations of the saw blade 8 could not also be kept constant. If a workpiece was cut with the saw blade 8 in this state, the cut surface of the workpiece would be uneven. In the following description, a period of time, such as the period of time T1 of the imaginary voltage V2, in which the driving voltage is lower than the induced voltage and no current flows to the motor 4 is called a non-energization period.

Figure 6B:
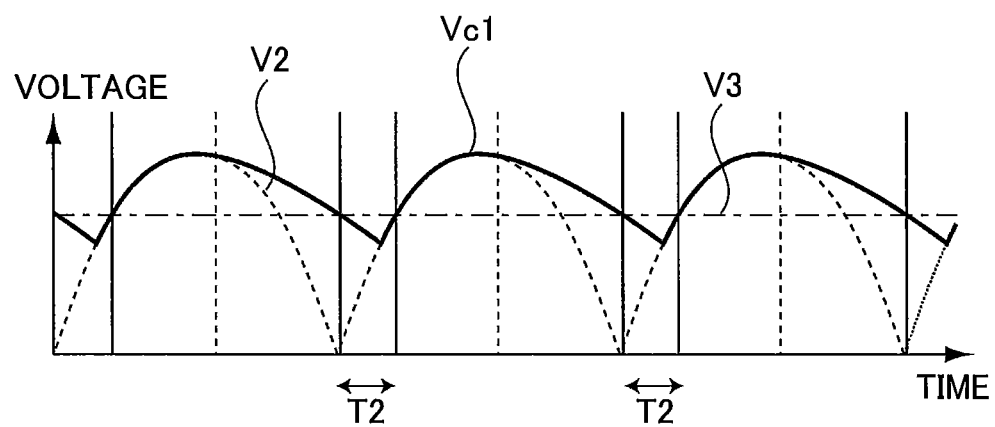
FIG. 6(B) is a graph illustrating a driving voltage applied to a motor of an electric circular saw according to a comparative example.

FIG. 6(B) illustrates a driving voltage Vc1 for an electric circular saw of a comparative example in which a smoothing capacitor having a small capacitance is disposed. The smoothing capacitor allows the driving voltage Vc1 to have a minimum voltage equal to or higher than zero. However, since the capacitance of the smoothing capacitor is small, a non-energization period T2 occurs. In the non-energization period T2, the driving voltage V1 is equal to or lower than the induced voltage V3. Although the non-energization period T2 is shorter than the non-energization period T1, but is still left.

In the present embodiment, the total capacitance of the capacitors 61B is sufficiently large. Thus, as illustrated in FIG. 6(A), the driving voltage V1 is always equal to or higher than the induced voltage V3, and the driving voltage V1 does not have any non-energization period. That is, the electric circular saw 1 of the present embodiment includes the capacitors 61B having the total capacitance which allows the driving voltage V1 to be always equal to or higher than the induced voltage V3. In other words, the total capacitance has a prescribed value which allows the driving voltage V1 to be always equal to or higher than the induced voltage V3. In the present embodiment, the prescribed capacitance is 1050 microfarads or more.

Figure 7:
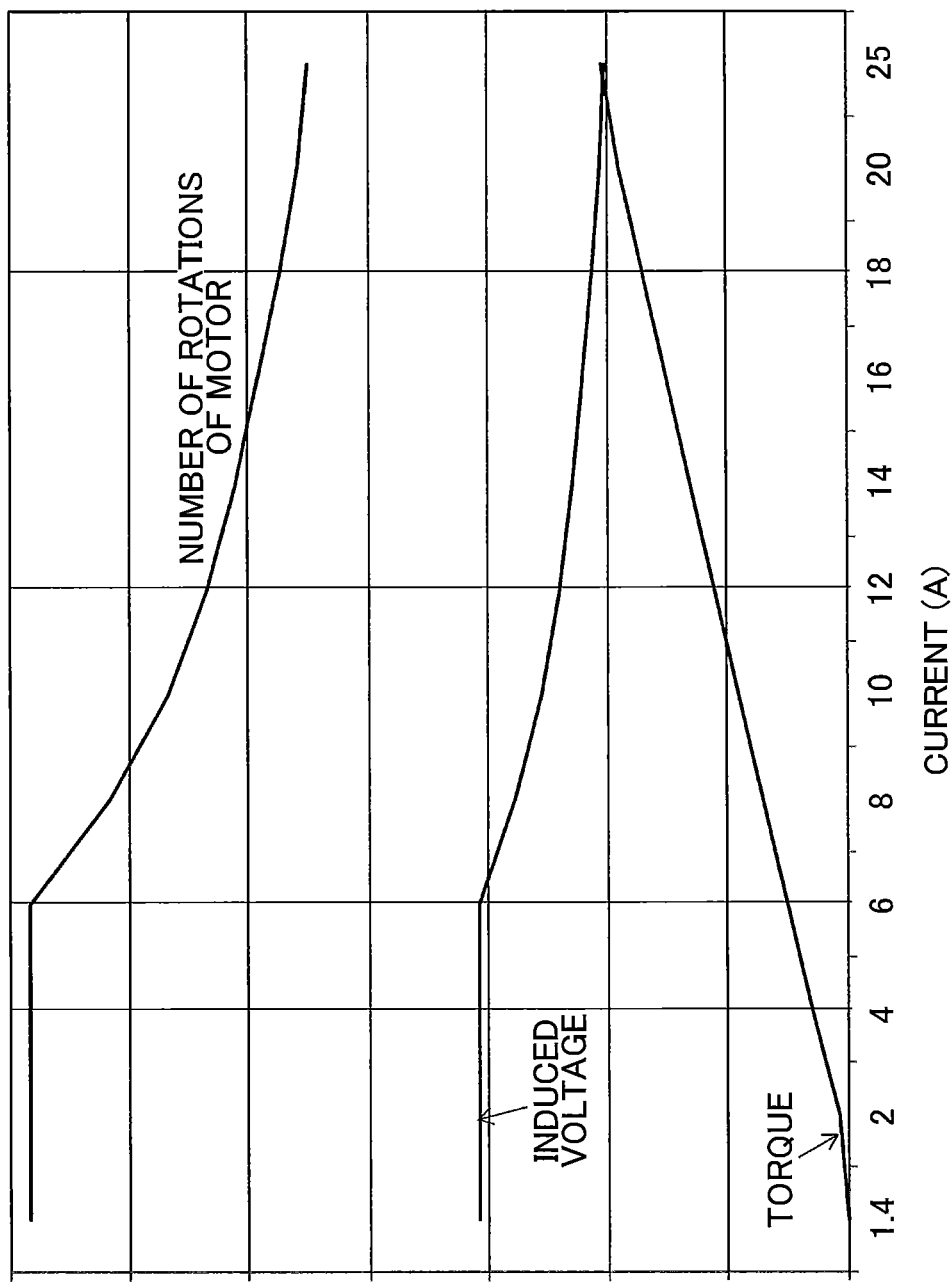
FIG. 7 is a graph illustrating a number of rotation of the motor, a torque generated by the motor, and an induced voltage generated in the motor according to the first embodiment of the present invention.

As described above, FIG. 6(A) is the graph in the case where the load of the saw blade 8 is constant (and where the constant-number-of-rotations control is performed). Next, with reference to FIG. 7, the description will be made for a case where the load of the saw blade changes. FIG. 7 illustrates a relationship between the effective current (A) (horizontal axis) which flows in the motor 4 and the torque (vertical axis) produced by the motor 4, a relationship between the effective current and the number of rotations (vertical axis) of the motor 4, and a relationship between the effective current and the induced voltage (vertical axis) produced by the motor 4. The graph of FIG. 7 illustrates the torque produced by the motor, the number of rotations of the motor, and the induced voltage produced by the motor. In practice, when the total capacitance of the capacitors 61B changes, the torque, the number of rotations, and the induced voltage also change from those shown in the graph of FIG. 7. However, the description for the change will not be made in detail because it is aimed herein to describe the tendency of the torque, the number of rotations, and the induced voltage. Hereinafter, the effective current is simply referred to as current.

The torque of FIG. 7 increases as the load of the saw blade 8 (or the load of the motor 4) increases. As illustrated in FIG. 7, the constant-number-of-rotations control is performed when the effective current which flows in the motor 4 is 6 A or less. In the constant-number-of-rotations control, when the load of the saw blade 8 increases, the controller increases the duty ratio. With this operation, the current which flows in the motor 4 increases. When the current which flows in the motor 4 increases, the torque increases. In the constant-number-of-rotations control, the induced voltage produced by the motor 4 is substantially constant. Thus, in the constant-number-of-rotations control, the amount of current which flows in the motor 4 changes in accordance with the load of the saw blade 8 (the torque produced by the motor 4).

In a range of FIG. 7 in which the current is larger than 6 A, the number of rotations of the motor 4 gradually decreases. That is, in this range, the constant-number-of-rotations control is not performed. Specifically, although the duty ratio is maximum (100% in the present embodiment) in this range, the number of rotations of the motor 4 decreases because the load of the saw blade 8 increases. Thus, when the number of rotations decreases, the induced voltage also decreases. When the induced voltage decreases, the current which flows in the motor 4 increases. As described above, when the number of rotations of the motor 4 decreases in the range in which the constant-number-of-rotations control cannot be performed (i.e. the range in which the current is larger than 6 A in FIG. 7), the current which flows in the motor 4 increases.

As described above, it is required to check the non-energization period not only when the load of the saw blade 8 (in other words, the torque produced by the motor 4, or the amount of current which flows in the motor 4) is constant, but also when the load is changed. For this reason, the capacitors 61B of the present embodiment are determined so as to satisfy the following two conditions. A first condition is that the capacitors 61B have a total capacitance which allows the driving voltage to be always equal to or higher than the induced voltage produced by the motor 4 when the constant-number-of-rotations control is performed. A second condition is that the capacitors 61B have a total capacitance which allows the driving voltage to be equal to or higher than the induced voltage in a range in which the constant-number-of-rotations control cannot be performed provided that the current flowing in the motor 4 is equal to or lower than an overcurrent threshold (a maximum allowable current value).

Specifically, the total capacitance was determined through the following experiments. First, a plurality of electric circular saws were prepared. The electric circular saws had the same configuration as that of the above-described electric circular saw 1, but had their total capacitances different from each other. Here, five electric circular saws will be described for example. The total capacitances of the capacitors of the five electric circular saws were 400, 500, 600, 1050, and 1400 microfarads. Then, various loads were applied to the five electric circular saws, and driving voltages were measured when loads were applied. FIGS. 8 to 11 illustrate measured driving voltages, and illustrate results obtained when the current which flowed in the motor 4 was 4 A, 6 A, 12 A, and 18 A. The load of the saw blade 8 increases as the current which flows in the motor increases in the order of 4 A, 6 A, 12 A, and 18 A. In FIGS. 8 to 11, the vertical axis represents the voltage (V), and the horizontal axis represents the time (s). In each of FIGS. 8 to 11, there are also illustrated a voltage obtained by full-wave rectifying a voltage of the commercial alternating-current power supply 500, and an induced voltage produced by the motor 4.

Figure 8:
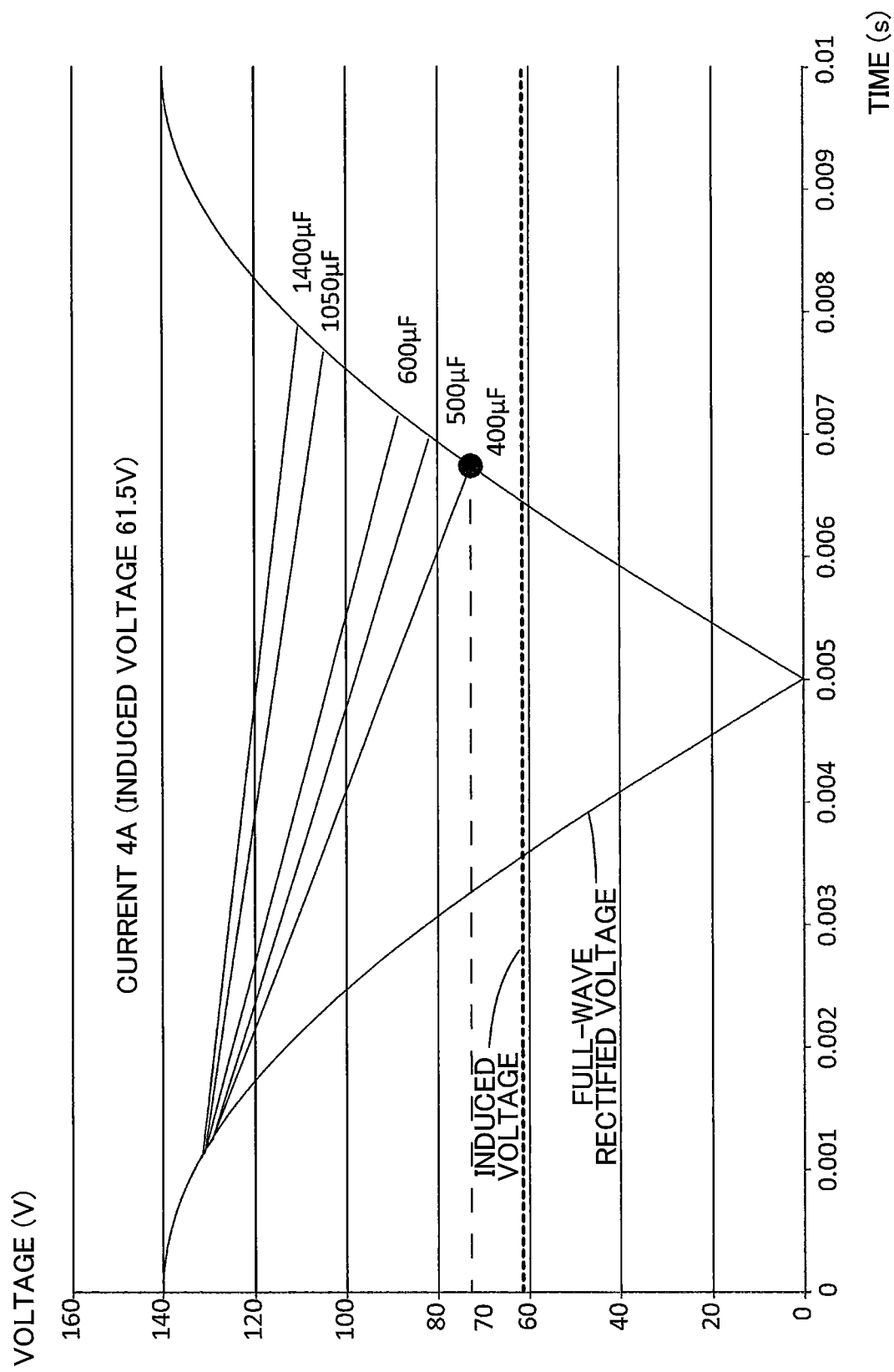
FIG. 8 is a graph illustrating a driving voltage when an effective current 4A flows in a motor of an electric circular saw used in an experiment, where the experiment is performed while changing capacitance of capacitors mounted on the circular saw.

FIG. 8 illustrates the driving voltage in the constant-number-of-rotations control performed when the current which flowed in the motor 4 was 4 A. In this case, if the total capacitance is 300 microfarads or more, the non-energization period does not occur. Thus, all of the driving voltages of the five electric circular saws are always equal to or higher than the induced voltage. In other words, in any case where the total capacitance is 400, 500, 600, 1050, or 1400 microfarads, the driving voltage is always equal to or higher than the induced voltage of the motor.

Figure 9:
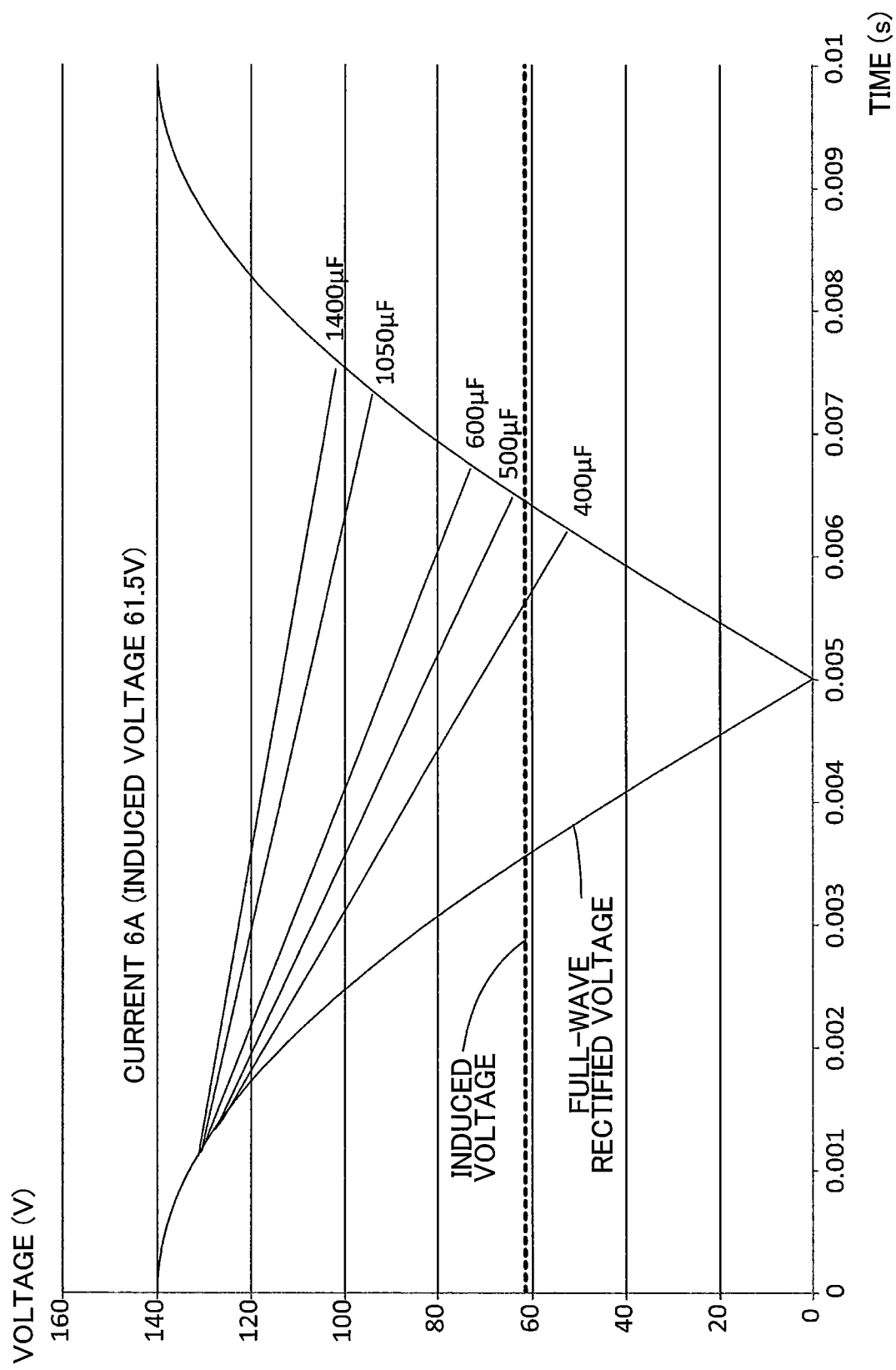
FIG. 9 is a graph illustrating a driving voltage when an effective current 6A flows in a motor of an electric circular saw used in an experiment, where the experiment is performed while changing capacitance of capacitors mounted on the circular saw.

FIG. 9 illustrates the driving voltage in the constant-number-of-rotations control performed when the current which flowed in the motor 4 was 6 A. Here, the current of 6 A is the maximum value of the current which flows in the motor under the constant-number-of-rotations control, and corresponds to the amount of current obtained when the load of the saw blade is maximum in the range for the constant-number-of-rotations control. In this case, if the total capacitance is 500 microfarads or more, the driving voltage is always equal to or higher than the induced voltage. Thus, in the case where the total capacitance is 400 microfarads, the non-energization period occurs. But, in the case where the total capacitance is 500, 600, 1050, or 1400 microfarads, the driving voltage is always equal to or higher than the induced voltage.

Figure 10:
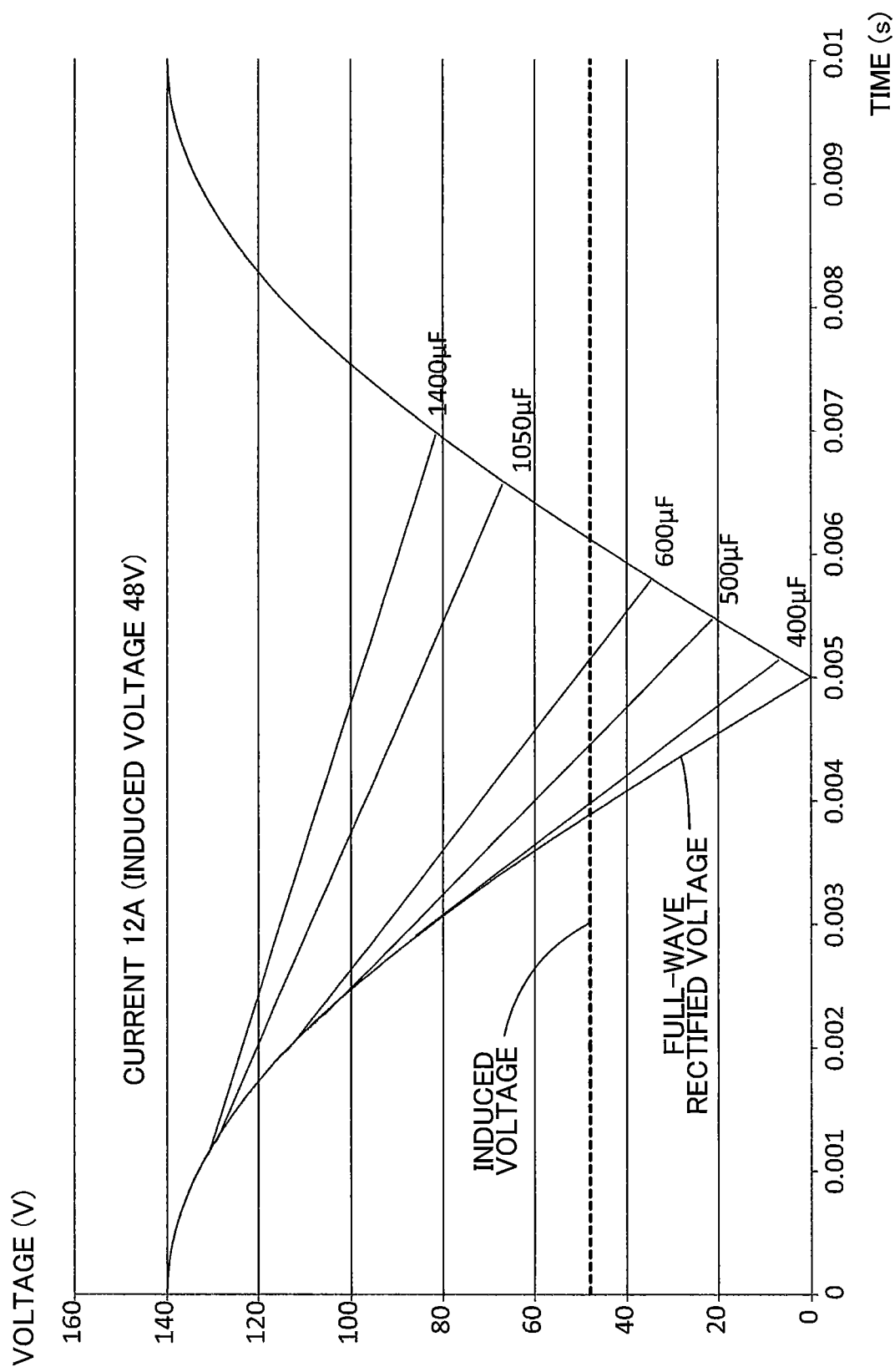
FIG. 10 is a graph illustrating a driving voltage when an effective current 12A flows in a motor of an electric circular saw used in an experiment, where the experiment is performed while changing capacitance of capacitors mounted on the circular saw.

FIG. 10 illustrates the driving voltage applied when the current which flowed in the motor 4 was 12 A. As illustrated in FIG. 7, when the current which flows the motor is 12 A, the motor cannot keep the target number of rotations and rotates at a speed lower than the target number of rotations, although the duty ratio has a maximum value (100%). Since the number of rotations of the motor decreases, the induced voltage decreases from the induced voltage obtained when the constant-number-of-rotations control is performed. In this case, if the total capacitance is 400, 500, or 600 microfarads, the non-energization period occurs, whereas if the total capacitance is 1050 or 1400 microfarads, the driving voltage is always equal to or higher than the induced voltage.

Figure 11:
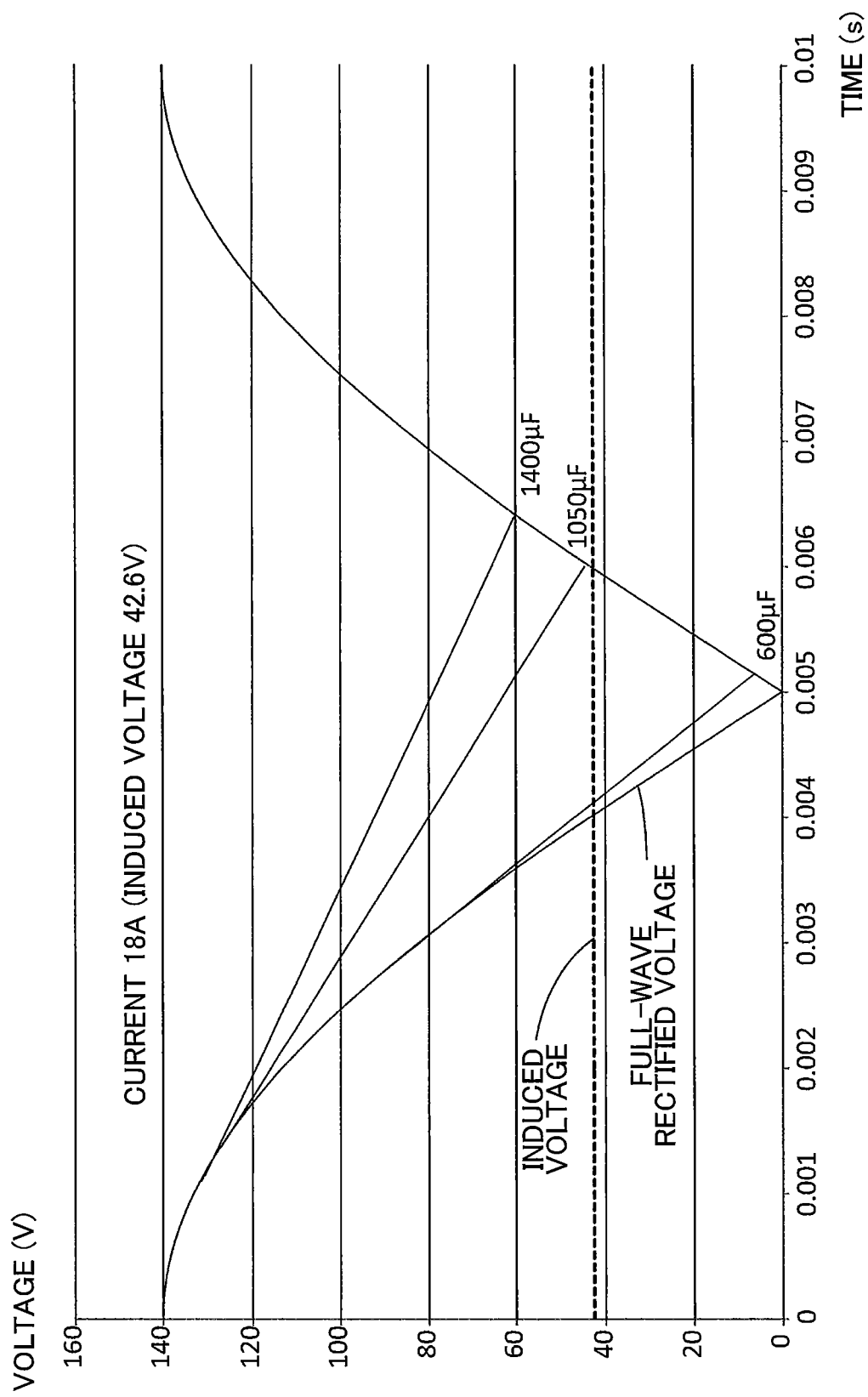
FIG. 11 is a graph illustrating a driving voltage when an effective current 18A flows in a motor of an electric circular saw used in an experiment, where the experiment is performed while changing capacitance of capacitors mounted on the circular saw.

FIG. 11 illustrates the driving voltage applied when the current which flowed in the motor 4 was 18 A, which corresponds to the overcurrent threshold. In this case, the motor rotates at a speed lower than the target number of rotations and also lower than the number of rotations of FIG. 10, although the duty ratio has the maximum value (100%). Since the number of rotations of the motor decreases, the induced voltage further decreases, thereby increasing the current which flows in the motor. In this case, if the total capacitance is 1050 microfarads or more, the driving voltage is always equal to or higher than the induced voltage. Thus, if the total capacitance is 600 microfarads or less, the non-energization period occurs, whereas if the total capacitance is 1050 or 1400 microfarads, the driving voltage is always equal to or higher than the induced voltage. Here, FIG. 11 does not illustrate the driving voltage of the electric circular saws having the total capacitances of 400 and 500 microfarads.

Figure 12:
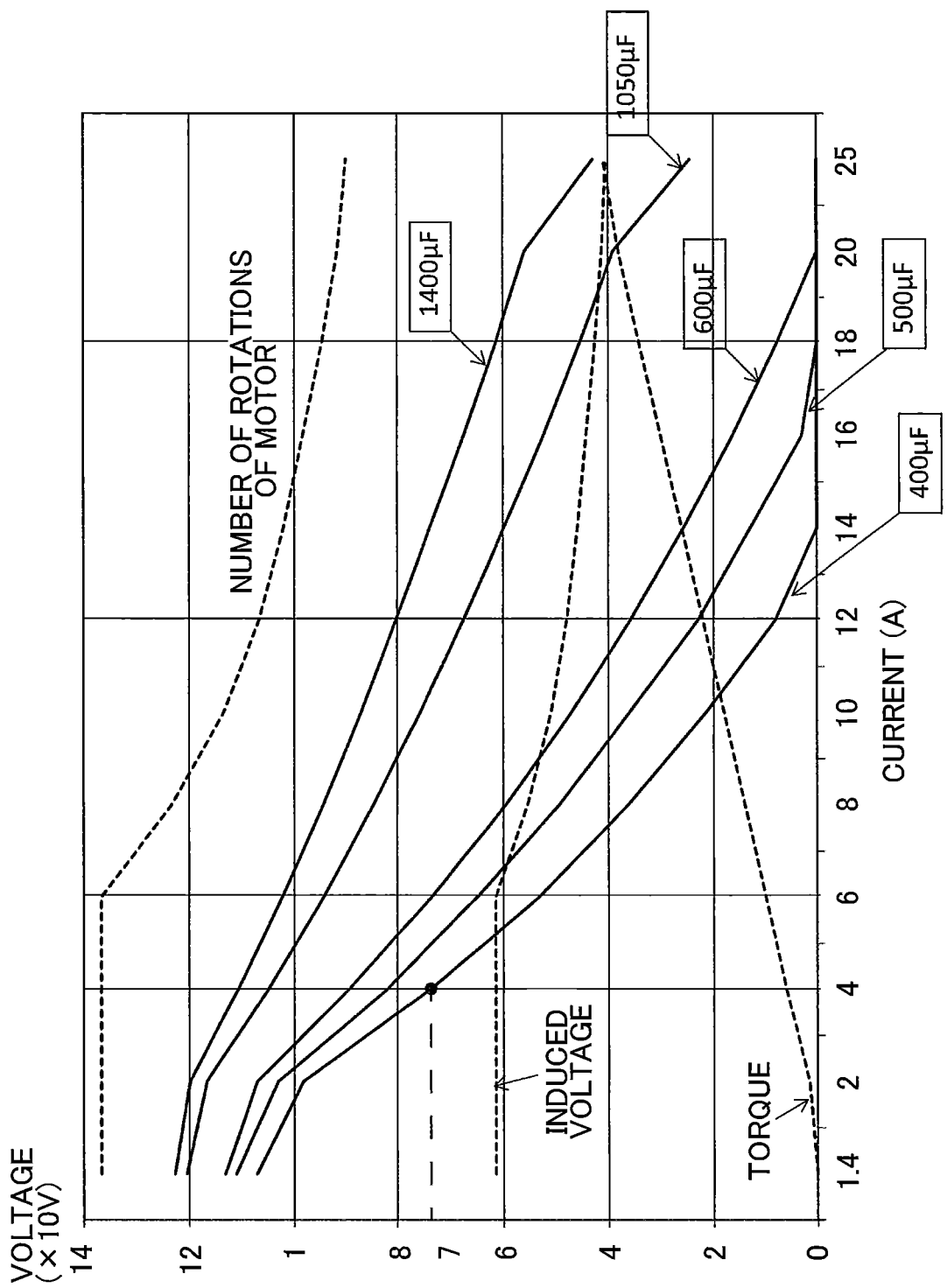
FIG. 12 is a graph illustrating minimum values of the driving voltages which are results of experiments shown in FIGS. 8-11.

FIG. 12 is a graph illustrating the above results of the experiments. In FIG. 12, five solid curves represent driving voltages of the above-described five electric circular saws. Specifically, the five solid curves of FIG. 12, associated with respective total capacitances, represent minimum driving voltages (driving-voltage minimum values) in the results of the experiments of FIGS. 8 to 11. That is, the five solid curves represent voltages across the discharged capacitors. For example, as illustrated in FIG. 12, the driving voltage across a capacitor having a total capacitance of 400 microfarads has a minimum value of about 70 V when the amount of current is 4 A. The voltage of about 70 V is a voltage across the capacitor having the total capacitance of 400 microfarads, obtained at a time of about 0.007 seconds in FIG. 8. FIG. 12 also illustrates the number of rotations of the motor 4, the induced voltage produced by the motor 4, and the torque produced by the motor 4, for reference. Here, FIG. 12 illustrates only the change in the number of rotations of the motor 4 and the torque produced by the motor 4, with respect to the current, and thus does not illustrate their numerical values.

From the above results of the experiments, it is understood that, when the constant-number-of-rotations control is performed (when the amount of current is 6 A or less), all the driving voltages decrease as the amount of current increases, as illustrated in FIG. 12. In other words, the necessary total capacitance of the capacitors 61B increases as the load of the saw blade 8 increases (that is, the torque or the amount of current which flows in the motor increases). Thus, based on the result obtained when the current which flowed in the motor was 6 A, a capacitance of 500 microfarads is determined as the total capacitance which allows the driving voltage to be always equal to or higher than the induced voltage produced by the motor provided that the constant-number-of-rotations control is performed. In other words, when the total capacitance is determined so that the driving voltage at the maximum current (6 A) in the constant-number-of-rotations control is always equal to or higher than the induced voltage produced by the motor, the determined total capacitance allows the driving voltage to be always equal to or higher than the induced voltage produced by the motor in the constant-number-of-rotations control.

As described above, in the range where the amount of current is 6 A or more, the constant-number-of-rotations control is not performed. As illustrated in FIG. 12, it is understood that all the driving voltages decrease as the amount of current increases in this range. In other words, the necessary total capacitance of the capacitors 61B increases as the load of the saw blade 8 increases (that is, the torque or the amount of current which flows in the motor increases). In order to determine a total capacitance which allows the driving voltage to be always equal to or higher than the induced voltage when the current flowing in the motor is equal to or lower than the overcurrent threshold (the maximum allowable current value), there is used a result obtained when the current which flowed in the motor had a value of the overcurrent threshold (the maximum allowable current value). In other words, if the total capacitance is determined so that the driving voltage is always equal to or higher than the induced voltage when the current which flows in the motor has the value of the overcurrent threshold, the determined total capacitance allows the driving voltage to be always equal to or higher than the induced voltage provided that the current which flows in the motor has a value equal to or lower than the overcurrent threshold (the maximum allowable current value). That is, a capacitance of 1050 microfarads is determined as the total capacitance which allows the driving voltage to be always equal to or higher than the induced voltage when the current which flows in the motor has a value equal to or lower than the overcurrent threshold (the maximum allowable current value).

Therefore, the total capacitance of the capacitors 61B of the electric circular saw 1 is 1050 microfarads in the present embodiment, but may be larger than that.

In the electric circular saw 1 of the present embodiment, the capacitors 61B have a total capacitance which allows the driving voltage to be always equal to or higher than the induced voltage produced by the motor 4 when the constant-number-of-rotations control is performed. If the driving voltage were lower than the induced voltage in the constant-number-of-rotations control, the number of rotations of the motor 4 could not be kept constant, and would become unstable. Thus, if a workpiece were cut with the motor 4 whose number of rotations were unstable, a cut surface of the workpiece would become uneven. However, since the electric circular saw 1 of the present embodiment allows the driving voltage to be always equal to or higher than the induced voltage, the number of rotations of the motor 4 is stable. Accordingly, the cut surface can be prevented from becoming uneven.

In addition, in the electric circular saw 1 of the present embodiment, the capacitors 61B have a total capacitance which allows the driving voltage to be always equal to or higher than the induced voltage produced by the motor 4 when the current flowing in the motor 4 has a value equal to or smaller than the maximum allowable current value. For this reason, even though the load of the saw blade 8 increases, the number of rotations of the motor 4 becomes stable. Thus, no matter how the workpiece is cut, the electric circular saw 1 of the present embodiment can prevent any cut surface of the workpiece from becoming uneven.

As described above, in the present embodiment, the capacitance of 1050 microfarads is determined as a lower limit of the total capacitance which satisfies the above-described first and the second conditions. Thus, the total capacitance of the capacitors 61B may have any value equal to or larger than 1050 microfarads, but the size of the capacitors 61B becomes large if the total capacitance is too large. As the capacitors 61B is upsized, it becomes more difficult for the electric circular saw 1 to house the capacitors 61B. As described above, in the present embodiment, a lower limit of the required total capacitance is determined, and the lower limit or a value close to the lower limit is determined as a total capacitance to be used. Thus, the total capacitance of the capacitors 61B can be prevented from being excessively increased. Thus, the capacitors 61B can be prevented from being excessively upsized.

Since the capacitors 61B of the present embodiment has a large capacitance, the capacitors 61B are needed to be sufficiently cooled. In the present embodiment, the longitudinal direction of the capacitors 61B extends in a direction in which the cooling air flows. With this arrangement, the capacitors 61B can be effectively cooled.

Second Embodiment

An electric circular saw 101 of a second embodiment is the same as the electric circular saw 1 of the first embodiment, except for an arrangement of the board case 71. Thus, only the arrangement of the board case 71 will be described.

Figure 13:
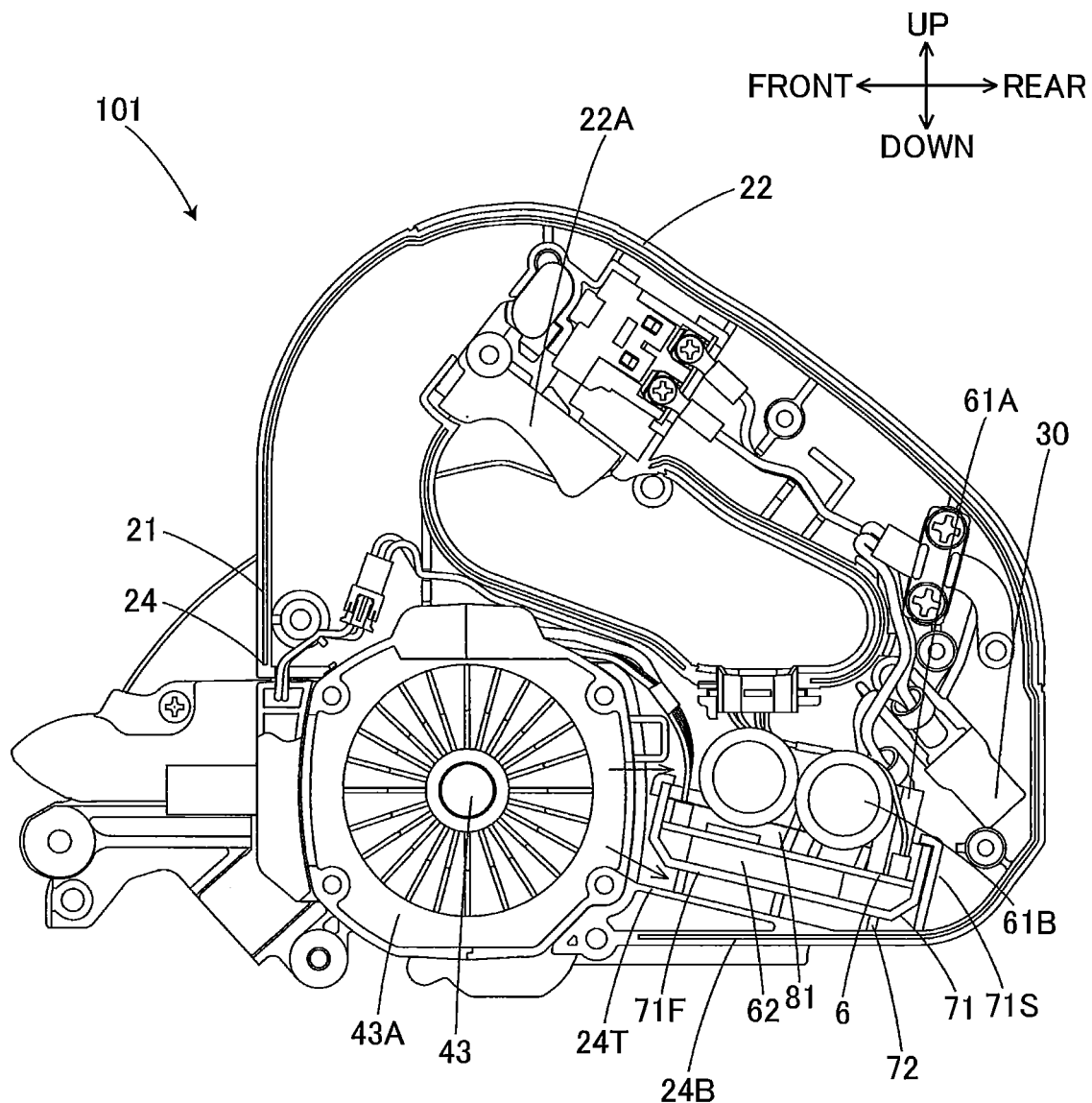
FIG. 13 is a side view illustrating an interior of an electric circular saw according to a second embodiment of the present invention.

As illustrated in FIG. 13, the motor housing 24 includes a sloped wall 24T extending diagonally forward and upward. The sloped wall 24T is disposed above the bottom wall 24B. The board case 71 is fixed to the upper surface of the sloped wall 24T via the ribs 72 such that the fixed wall 71F is disposed along the sloped wall 24T. The fixed wall 71F of the board case 71 is parallel with the control board 6. Thus, the control board 6 is also disposed along the sloped wall 24T.

As described above, the fan 43A is the centrifugal fan. The fan 43A can rotate on the same axis as that of the rotation shaft 43 of the motor 4. The control board 6 extends in a radial direction centered at the rotation shaft 43. Specifically, the control board 6 is disposed substantially parallel with the radial direction at a position where the control board 6 is disposed. In other words, the control board 6 and the rotation shaft 43 are disposed along a substantially straight line. The control board 6 and the bottom surface of the board case 71 are parallel with each other. Thus, the board case 71 is also disposed substantially parallel with the radial direction at the position where the board case 71 is disposed. In addition, the board case 71 and the rotation shaft 43 are disposed along a substantially straight line.

The capacitors 61B are disposed so that the longitudinal direction of the capacitors 61B extends in the right-left direction. In other words, the longitudinal direction of the capacitors 61B extends in a direction in which the cooling air flows. The capacitors 61B are disposed adjacent to each other, at one edge portion of the control board 6 in the direction in which the cooling air flows.

In the configuration of the electric circular saw 101 of the second embodiment, the control board 6 is disposed substantially parallel with the radial direction. Here, this radial direction is at the position where the control board 6 is disposed, and centered at the rotation shaft 43. Thus, the cooling air generated by the centrifugal fan 43A can smoothly flow above and below the control board 6. The capacitors 61B are disposed opposite to the switching portion 62 with respect to the control board 6. That is, the capacitors 61B are disposed above the control board 6, and the switching portion 62 is disposed below the control board 6. The capacitors 61B and the switching portion 62 are both components which generate heat. However, since the cooling air can smoothly flow above and below the control board 6, the capacitors 61B and the switching portion 62 can be efficiently cooled.

Third Embodiment

An electric circular saw 201 of a third embodiment is the same as the electric circular saw 1 of the first embodiment, except for an arrangement of the board case 71. Thus, only the arrangement of the board case 71 will be described, and the description of the other configuration will be omitted.

Figure 14:
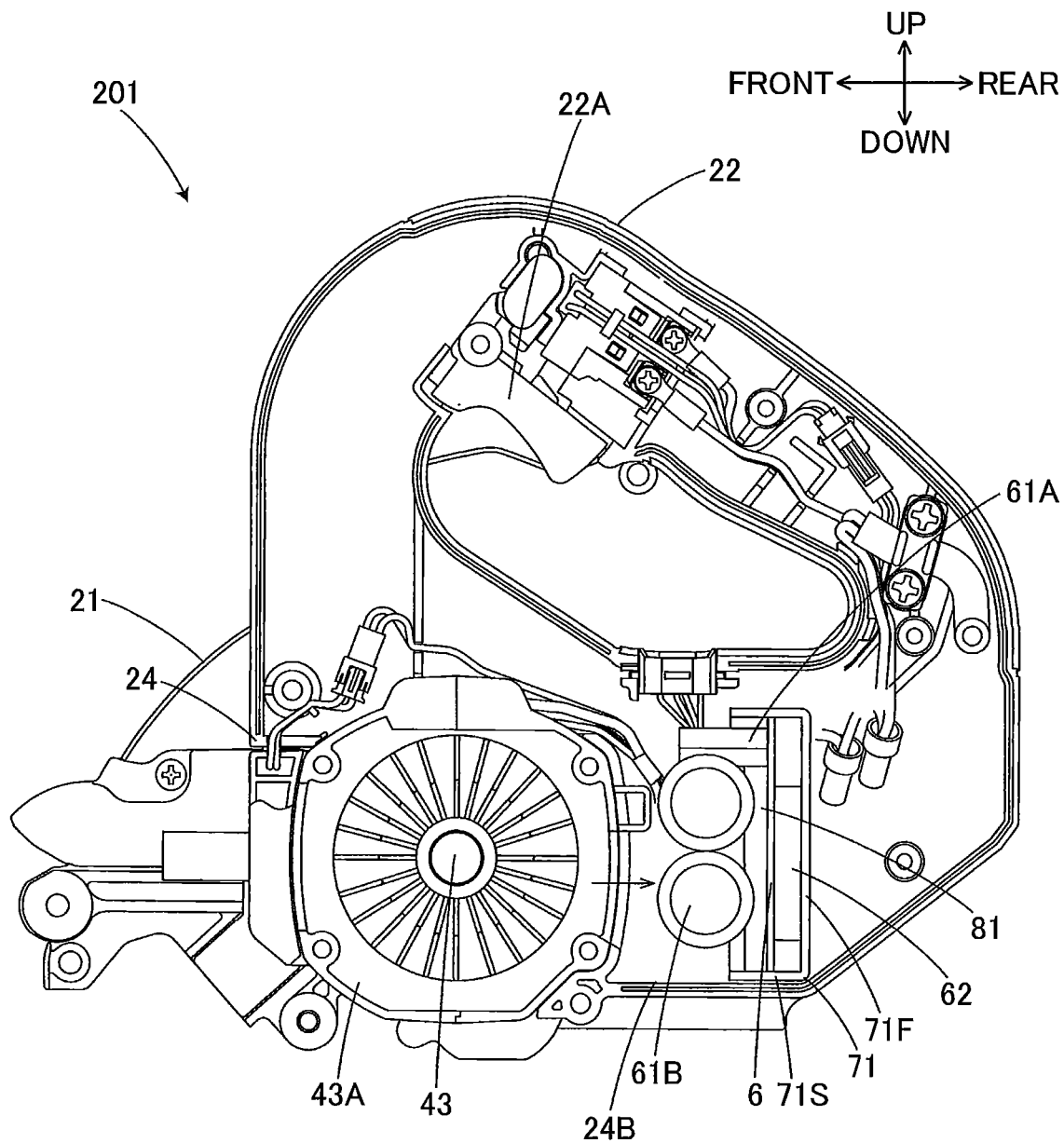
FIG. 14 is a side view illustrating an interior of an electric circular saw according to a third embodiment of the present invention.

As illustrated in FIG. 14, the fixed wall 71F of the board case 71 extends in the upward-downward direction so that the capacitors 61B face the fan 43A. The capacitors 61B are disposed closer to the fan 43A than the fixed wall 71F and the control board 6 to the fan 43A. The side wall 71S is in contact with and fixed to the bottom wall 24B. Thus, in the third embodiment, the ribs 72 are not provided.

The capacitors 61B are disposed so that the longitudinal direction of the capacitors 61B extends in the right-left direction. In other words, the longitudinal direction of the capacitors 61B extends in a direction in which the cooling air flows. The capacitors 61B are disposed adjacent to each other, at one edge portion of the control board 6 in the direction in which the cooling air flows.

With the above configuration, the cooling air generated by the fan 43A can effectively flow through a peripheral space of the capacitors 61B, and cool the capacitors 61B. The side wall 71S may be fixed to the bottom wall 24B via the ribs 72.

Fourth Embodiment

An electric circular saw 301 of a fourth embodiment differs from the first embodiment in a configuration of the board case 71 and differs from the first embodiment in that a capacitor 161B is disposed instead of the capacitors 61B. The other configuration of the electric circular saw 301 is the same as the configuration of the electric circular saw 1 of the first embodiment. Thus, only the arrangement of the capacitor 161B and the board case 71 will be described, and the description of the other configuration will be omitted.

Figure 15:
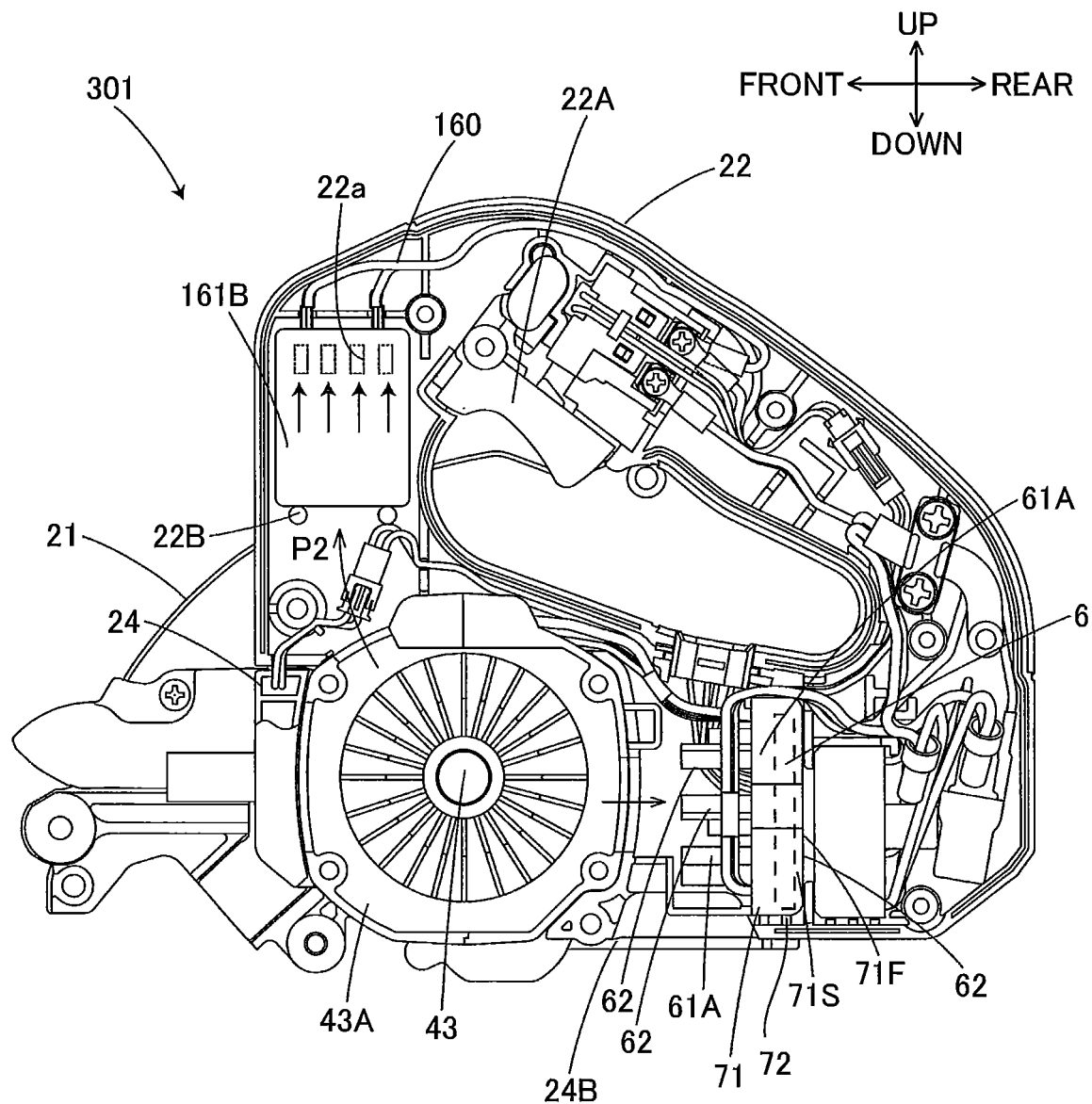
FIG. 15 is a side view illustrating an interior of an electric circular saw according to a fourth embodiment of the present invention.

As illustrated in FIG. 15, in the fourth embodiment, only the single capacitor 161B is provided in the electric circular saw 301. The capacitor 161B is an electrolytic capacitor whose capacitance is the same as the total capacitance of the two capacitors 61B of the first embodiment. The capacitor 161B is not mounted to the control board 6, but is mounted in the handle portion 22. Specifically, a plurality of bosses 22B are disposed in the handle portion 22, and support the bottom surface of the cylindrical capacitor 161B from below. The interior of the handle portion 22 communicates with the housing room 21a. The capacitor 161B is disposed above the centrifugal fan 43A. As illustrated in FIG. 1, the handle portion 22 has a right end wall 22R in which an outlet 22a is formed. Thus, in the motor housing 24 and the handle portion 22, a wind path P2 is formed from the fan 43A to the outlet 22a. The cooling air generated by the fan 43A flows through space in the vicinity of the capacitor 161B, and is discharged from the outlet 22a. The wind path P2 is one example of the second wind path.

The capacitor 161B has a substantially cylindrical shape whose generating line is the longitudinal direction of the capacitor 161B. The capacitor 161B is disposed so that the longitudinal direction of the capacitor 161B extends in the upward-downward direction. In other words, the longitudinal direction of the capacitor 161B extends in a direction in which the cooling air flows.

As in the configuration illustrated in FIG. 5, the capacitor 161B is electrically disposed, following the diode bridge 61A and preceding the switching portion 62, and connected between the diode bridge 61A and the switching portion 62 via cables 160 (FIG. 15).

The fixed wall 71F of the board case 71 extends in the upward-downward direction. The side wall 71S is fixed to the bottom wall 24B via the ribs 72. The switching portion 62 and the diode bridge 61A are disposed opposite to the board case 71 with respect to the control board 6, and face the rotation shaft 43. Thus, the switching portion 62 is not in contact with the board case 71.

In the present embodiment, the capacitor 161B is not disposed on the control board 6. Thus, components such as the switching portion 62 are disposed on the control board 6 in a way different from the first embodiment. Specifically, the switching portion 62 is disposed closer to the fan 43A than the control board 6 to the fan 43A, so as to be exposed to the cooling air.

In the above configuration, the capacitor 161B is disposed above the fan 43A. The cooling air generated by the fan 43A flows through a space in the vicinity of the capacitor 161B, and is discharged from the outlet 22a. Since the cooling air flows straight from the fan 43A to the space in the vicinity of the capacitor 161B, the capacitor 161B can be efficiently cooled. In addition, the arrangement can prevent heat generated by components of the control board 6 from affecting the capacitor 161B.

The switching portion 62 faces the rotation shaft of the fan 43A. Thus, since the cooling air generated by the fan 43A efficiently flows through a space in the vicinity of the switching portion 62, whereby the switching portion 62 can be efficiently cooled.

The power tool according to the present invention is not limited to the above described embodiments, and various modifications and improvements can be made thereto within a scope of claims. For example, the power tool may not be an electric circular saw, and may be other power tools such as an electric drill.

The switching portion 62 according to the first embodiment changes the driving voltage applied to the coils U, V, and W, and adjusts the period of time in which the driving voltage is applied, in accordance with the duty ratio. Instead of this, the switching portion 62 may only change the driving voltage applied to the coils U, V, and W, and the period of time in which the driving voltage is applied may be adjusted by another switching element other than the switching portion 62. For example, the other switching element may be disposed between the rectifying and smoothing portion 61 and the switching portion 62, or between the switching portion 62 and the motor 4.

The electric circular saw 1 may have a switch with which an operator can select one of target numbers of rotations. In this case, under a condition that the maximum target number of rotations is selected from among the selectable target numbers of rotations, the capacitors 61B has a total capacitance which allows the driving voltage to be always equal to or higher than the induced voltage when the current which flows in the motor 4 has a value equal to or smaller than the maximum current value which is permitted to flow in the motor 4.

REFERENCE SIGNS LIST 1, 101, 201, 301 electric circular saw
2 housing
4 motor
6 control board
8 saw blade
21 main-body housing
21a housing room
24 motor housing
31a inlet
22a, 31b outlet
43a fan
43 rotational axis
61 rectifying and smoothing portion
61A diode bridge
61B, 161B capacitor
62 switching portion
64 controller

The invention claimed is:

1. A power tool comprising:
a brushless motor configured to drive and rotate when a voltage applied to the brushless motor is larger than or equal to an induced voltage;
a supplying circuit configured to apply a driving voltage to the brushless motor; and
a controller configured to control the supplying circuit, wherein the supplying circuit includes:
a rectifying circuit configured to rectify an alternating voltage and output a rectified voltage;
a capacitor configured to smooth the voltage inputted via the rectifying circuit; and
a switching circuit configured to perform a switching operation based on a PWM signal to adjust a period during which the driving voltage is applied,
wherein the controller is configured to set a duty ratio within a prescribed range, and output the PWM signal of the set duty ratio to the switching circuit to control the switching operation,
wherein the controller is configured to perform a constant-number-of-rotation control (constant rotational speed control) for controlling the brushless motor to rotate at a constant target rotation number by changing the duty ratio,
wherein the capacitor has a capacitance allowing a smoothed voltage to be always larger than or equal to the induced voltage during the constant-number-of-rotation control (constant rotational speed control),
wherein the controller is capable of maintaining the constant speed control when a load of the motor is smaller than or equal to a first load and incapable of maintaining the constant speed control when the load of the motor is larger than the first load,
wherein the capacitor has the capacitance which allows the smoothed voltage to be always larger than the pulsating induced voltage in a case where the load of the motor is smaller than or equal to the first load, and allows a minimum of the smoothed voltage to be smaller than the pulsating induced voltage in a case where the load of the motor exceeds a second load larger than the first load.

2. The power tool according to claim 1, wherein the controller is configured to control the supplying circuit to stop application of the driving voltage to the brushless motor in a case where the current flowing in the brushless motor is larger than a maximum allowable current value,
wherein the capacitor has the capacitance allowing the driving voltage to be always larger than or equal to the induced voltage while the current flowing in the brushless motor is smaller than the maximum allowable current value.

3. The power tool according to claim 1, wherein the capacitance is larger than or equal to 500 microfarads.

4. The power tool according to claim 1, wherein the capacitor includes a plurality of capacitors connected in parallel.

5. The power tool according to claim 1, wherein the brushless motor includes a rotor configured to rotate about a rotational axis,
the power tool further comprising:
a fan configured to rotate coaxially with the rotational axis; and
a housing accommodating the brushless motor, the supplying circuit, and the fan,
wherein the housing has an opening portion,
wherein the housing is formed with a wind path therein, the wind path extending from the fan to the opening portion,
wherein a longitudinal direction of the capacitor extends in a direction of a cooling air flowing in the wind path.

6. The power tool according to claim 5, further comprising:
a circuit board to which the switching circuit is mounted; and
a board case accommodating the circuit board,
wherein the capacitor is positioned at an end of the board case at a side where the opening portion is formed.

7. The power tool according to claim 6, wherein the switching circuit is in contact with the circuit board.

8. The power tool according to claim 6, wherein a filler is filled between the capacitor and the circuit board.

9. The power tool according to claim 1, wherein the brushless motor includes a rotor configured to rotate about a rotational axis, the power tool further comprising:
a circuit board to which the switching circuit is mounted;
a fan configured to rotate coaxially with the rotational axis; and
a housing accommodating the circuit board, the brushless motor, the supplying circuit, and the fan,
wherein the housing has a first opening portion and a second opening portion which are formed at different positions,
wherein the housing is formed with a first wind path and a second wind path therein, the first wind path extending from the fan to the first opening portion, the second wind path extending from the fan to the second opening portion,
wherein the circuit board is disposed on the first wind path,
wherein the capacitor is disposed on the second wind path.

10. The power tool according to claim 9, wherein the housing includes a first wall portion disposed at one end thereof in an extending direction of the rotational axis and a second wall portion disposed at another end thereof in extending direction, the first wall portion having the first opening portion, the second wall portion having the second opening portion,
wherein the first opening portion has a region overlapping with the fan in a vertical direction,
wherein the second opening portion is disposed above the fan.

11. The power tool according to claim 1, wherein the brushless motor includes a rotor configured to rotate about a rotational axis, the power tool further comprising:
a centrifugal fan configured to rotate coaxially with the rotational axis; and
a circuit board having one surface on which the capacitor is disposed and another surface on which the switching circuit is disposed,
wherein the circuit board extends in a radial direction of the rotational axis.

12. The power tool according to claim 1, wherein the brushless motor includes a rotor configured to rotate about a rotational axis, the power tool further comprising:
a centrifugal fan configured to rotate coaxially with the rotational axis; and
a circuit board to which the capacitor is mounted,
wherein the capacitor is disposed closer to the centrifugal fan than the circuit board to the centrifugal fan.

13. The power tool according to claim 1, wherein the capacitor has the capacitance which allows a minimum of the smoothed voltage to be lower than the pulsating induced voltage in a case where the current flowing in the brushless motor is larger than a maximum allowable current value.

14. The power tool according to claim 1, wherein the controller is to stop rotating of the motor when the load of the motor exceeds an overcurrent threshold value larger than the second load.

* * * * *